US011297393B2

(12) United States Patent
Chai et al.

(10) Patent No.: US 11,297,393 B2
(45) Date of Patent: *Apr. 5, 2022

(54) SELECTION INTERFACE WITH SYNCHRONIZED SUGGESTION ELEMENTS

(71) Applicant: OpenTV, Inc., San Francisco, CA (US)

(72) Inventors: Crx K. Chai, Oakland, CA (US); Robert Chen, Mountain View, CA (US); Alex Fishman, San Francisco, CA (US); Marc Stoksik, Palo Alto, CA (US); Colin Shengcai Zhao, Sunnyvale, CA (US); David Daniel Kempe, San Jose, CA (US); Venkata Ratnam Vadhri, Bengaluru (IN)

(73) Assignee: OPENTV, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,434

(22) Filed: Sep. 28, 2020

(65) Prior Publication Data

US 2021/0084379 A1  Mar. 18, 2021

Related U.S. Application Data

(63) Continuation of application No. 16/128,007, filed on Sep. 11, 2018, now Pat. No. 10,848,832.

(51) Int. Cl.
*H04N 21/482* (2011.01)
*H04N 21/431* (2011.01)
*H04N 21/472* (2011.01)

(52) U.S. Cl.
CPC ..... *H04N 21/4826* (2013.01); *H04N 21/4312* (2013.01); *H04N 21/472* (2013.01)

(58) Field of Classification Search
CPC .......... H04N 21/4826; H04N 21/4312; H04N 21/472
See application file for complete search history.

(56) References Cited

U.S. PATENT DOCUMENTS

| 5,754,809 A | 5/1998 | Gandre |
| 7,979,879 B2 | 7/2011 | Kazama et al. |

(Continued)

FOREIGN PATENT DOCUMENTS

WO  2020055681  3/2020

OTHER PUBLICATIONS

"International Application Serial No. PCT US2019 049908, International Search Report dated Dec. 5, 2019", 4 pgs.

(Continued)

*Primary Examiner* — Oschta I Montoya
(74) *Attorney, Agent, or Firm* — Schwegman, Lundberg & Woessner, P.A.

(57) ABSTRACT

A machine detects a set of first control operations and, in response, causes a display screen to present a graphical interface in which a central window suggests first content by presenting a first preview and a first identifier superimposed on the first preview. The machine then detects a second control operation that indicates dismissal of the first content. In response to the second control operation, the machine causes the display screen to present a transition to an interest-improved version of the graphical interface. The transition includes sliding the first preview, the first identifier, a second preview, and a second identifier together in a shared direction and at a shared speed within the central window. The second preview and the second identifier correspond to second content. In the interest-improved ver- (Continued)

sion of the graphical interface, the central window suggests the second content by presenting the second preview and the second identifier.

20 Claims, 15 Drawing Sheets

(56) References Cited

U.S. PATENT DOCUMENTS

| | | | |
|---|---|---|---|
| 8,302,124 B2 | 10/2012 | Guo et al. | |
| 9,542,060 B1* | 1/2017 | Brenner | H04N 21/84 |
| 10,848,832 B2 | 11/2020 | Chai et al. | |
| 2002/0033848 A1* | 3/2002 | Sciammarella | G06F 3/0481 |
| | | | 715/838 |
| 2005/0193015 A1 | 9/2005 | Logston et al. | |
| 2008/0155595 A1 | 6/2008 | Stallings et al. | |
| 2010/0262931 A1 | 10/2010 | Woods et al. | |
| 2011/0074918 A1* | 3/2011 | Klappert | H04N 5/2628 |
| | | | 348/43 |
| 2013/0042271 A1* | 2/2013 | Yellin | H04N 21/25866 |
| | | | 725/41 |
| 2014/0053198 A1* | 2/2014 | Sirpal | H04N 21/42204 |
| | | | 725/43 |
| 2017/0195734 A1 | 7/2017 | Park et al. | |
| 2020/0084515 A1 | 3/2020 | Chai et al. | |

OTHER PUBLICATIONS

"International Application Serial No. PCT US2019 049908, Written Opinion dated Dec. 5, 2019", 7 pgs.

"U.S. Appl. No. 16/128,007, Notice of Allowance dated Jun. 29, 2020", 14 pgs.

"U.S. Appl. No. 16/128,007, 312 Amendment filed Sep. 28, 2020", 10 pages.

"U.S. Appl. No. 16/128,007, PTO Response to Rule 312 Communication dated Oct. 19, 2020", 2 pgs.

"U.S. Appl. No. 16/128,007, 312 Amendment filed Oct. 20, 2020", 10 pgs.

"U.S. Appl. No. 16/128,007, PTO Response to Rule 312 Communication dated Oct. 27, 2020", 2 pgs.

"International Application Serial No. PCT US2019 049908, International Preliminary Report on Patentability dated Mar. 25, 2021", 9 pages.

"European Application Serial No. 19773255.5, Response filed Apr. 20, 2021 to to Communication pursuant to Rules 161(1) and 162 EPC", 3 pages.

* cited by examiner

SELECTION INTERFACE WITH SYNCHRONIZED SUGGESTION ELEMENTS

PRIORITY APPLICATION

This application claims priority to U.S. patent application Ser. No. 16/128,007, filed Sep. 11, 2018, the disclosure of which is incorporated herein in its entirety by reference.

TECHNICAL FIELD

The subject matter disclosed herein generally relates to the technical field of special-purpose machines that facilitate generation and provision of interactive graphical user interfaces (GUIs), including software-configured computerized variants of such special-purpose machines and improvements to such variants, and to the technologies by which such special-purpose machines become improved compared to other special-purpose machines that also facilitate generation and provision of interactive GUIs. Specifically, the present disclosure addresses systems and methods to facilitate generation and provision of an interactive graphical selection interface.

BACKGROUND

A machine may be configured to interact with a user by generating and causing presentation of an interactive GUI through which the user can make one or more selections from among a set of multiple available options. For example, a machine in the example form of a set-top box may be configured (e.g., by suitable hardware, software, or both) to generate an interactive GUI that appears on a display screen as a rectangular grid (e.g., a data table) in which various pieces of text information are respectively contained in simultaneously displayed rectangular cells of the grid, with each cell corresponding to a different available option (e.g., different media content available for viewing, queuing, recording, or any suitable combination thereof). Moreover, within the displayed grid, one of the cells of text information may be highlighted (e.g., with a cursor or with special outlining) to indicate that its corresponding option is presently selectable (e.g., by performance of a certain control operation).

The machine may generate such a GUI and cause the generated GUI to be presented to a user via a display screen. The user may operate a controller (e.g., a remote control, a smartphone, or a companion device) configured to facilitate interactions with the GUI by one or more control operations (e.g., a control operation that moves the cursor or the highlight to a different cell in the grid or a control operation that selects the presently selectable option corresponding to the currently highlighted cell). In some situations, however, such a grid of text information may seem visually crowded to the user, may provide the user with an unsatisfactory amount of information per cell, may be difficult for the user to read, may seem visually boring to the user, or any combination thereof.

BRIEF DESCRIPTION OF THE DRAWINGS

Some embodiments are illustrated by way of example and not limitation in the figures of the accompanying drawings.

DETAILED DESCRIPTION

Figure 1:
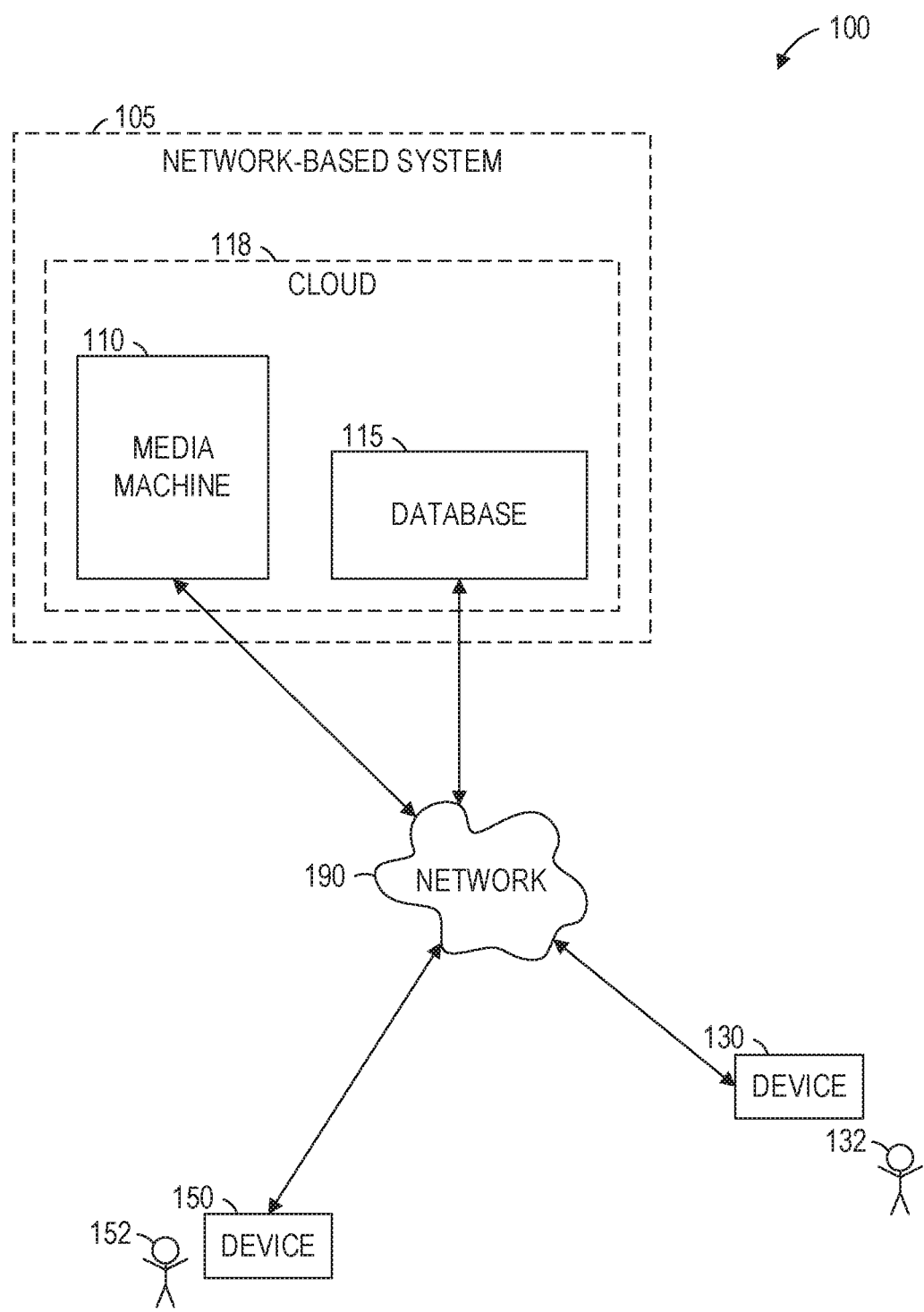
FIG. 1 is a network diagram illustrating a network environment suitable for generating, providing, or using a selection GUI with synchronized suggestion elements, according to some example embodiments.

Example methods (e.g., algorithms) facilitate generation and provision of an interactive selection GUI with synchronized suggestion elements, and example systems (e.g., special-purpose machines configured by special-purpose software) are configured to facilitate generation and provision of such an interactive selection GUI. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine is specially configured to generate and cause presentation of the interactive selection GUI and then interact with a user via the interactive selection GUI. The machine may take the form of a media server machine (e.g., a regional distribution server or a home media server), a media client device (e.g., a set-top box, game console, a smartphone, or a smart television), or any suitable combination thereof. In accordance with its special configuration, the machine detects a set of one or more first control operations, and this detection may occur during presentation of current content (e.g., currently playing media content) on a display screen. In response to the set of first control operations, the machine commands, controls, or otherwise causes the display screen to present a graphical interface (e.g., a GUI) in which a central window suggests first alternative content (e.g., first alternative media content) by presenting a first preview of the first alternative content and a first identifier of the first alternative content superimposed on the first preview.

As specially configured, the machine then detects a second control operation to dismiss the suggested first alternative content or that otherwise indicates dismissal of the suggested first alternative content (e.g., due to the user's temporary or persistent non-interest in the first alternative content). In response to the second control operation, the machine commands, controls, or otherwise causes the display screen to present a transition (e.g., an animated graphical transition) to a modified version of the graphical interface. The modified version of the graphical interface may be a new version, an enhanced version, an interest-improved version (e.g., more likely to fit the user's interest than the previously suggested and dismissed first alternative content), a subsequent version, or any suitable combination thereof. The transition includes sliding (e.g., scrolling) the first preview, the first identifier, a second preview, and a second identifier together in a shared direction (e.g., a common direction, a shared-in-common direction, or a unison direction) and at a shared speed (e.g., a common speed, a shared-in-common speed, or a unison speed) within the central window. The central window may spatially truncate (e.g., mask or crop) the first preview sliding out of view and may spatially truncate the second preview sliding into view. The second preview and the second identifier correspond to second alternative content (e.g., second alternative media content). Furthermore, the transition includes presenting the interest-improved version of the graphical interface. In the interest-improved version of the graphical interface, the central window suggests the second alternative content by presenting the second preview and the second identifier superimposed on the second preview. Further details are discussed below and illustrated in the figures discussed below.

FIG. 1 is a network diagram illustrating a network environment 100 suitable for generating, providing, or using a selection GUI with synchronized suggestion elements, according to some example embodiments. The network environment 100 includes a media machine 110, a database 115, and devices 130 and 150, all communicatively coupled to each other via a network 190. The media machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The media machine 110 and the devices 130 and 150 may each be implemented in a special-purpose (e.g., specialized) computer system, in whole or in part, as described below with respect to FIG. 15.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a home media system (e.g., a home theater system or other home entertainment system), a tablet computer, a navigational device, a set-top box, a smart television, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a set-top box, a smart television, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 15, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the media machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
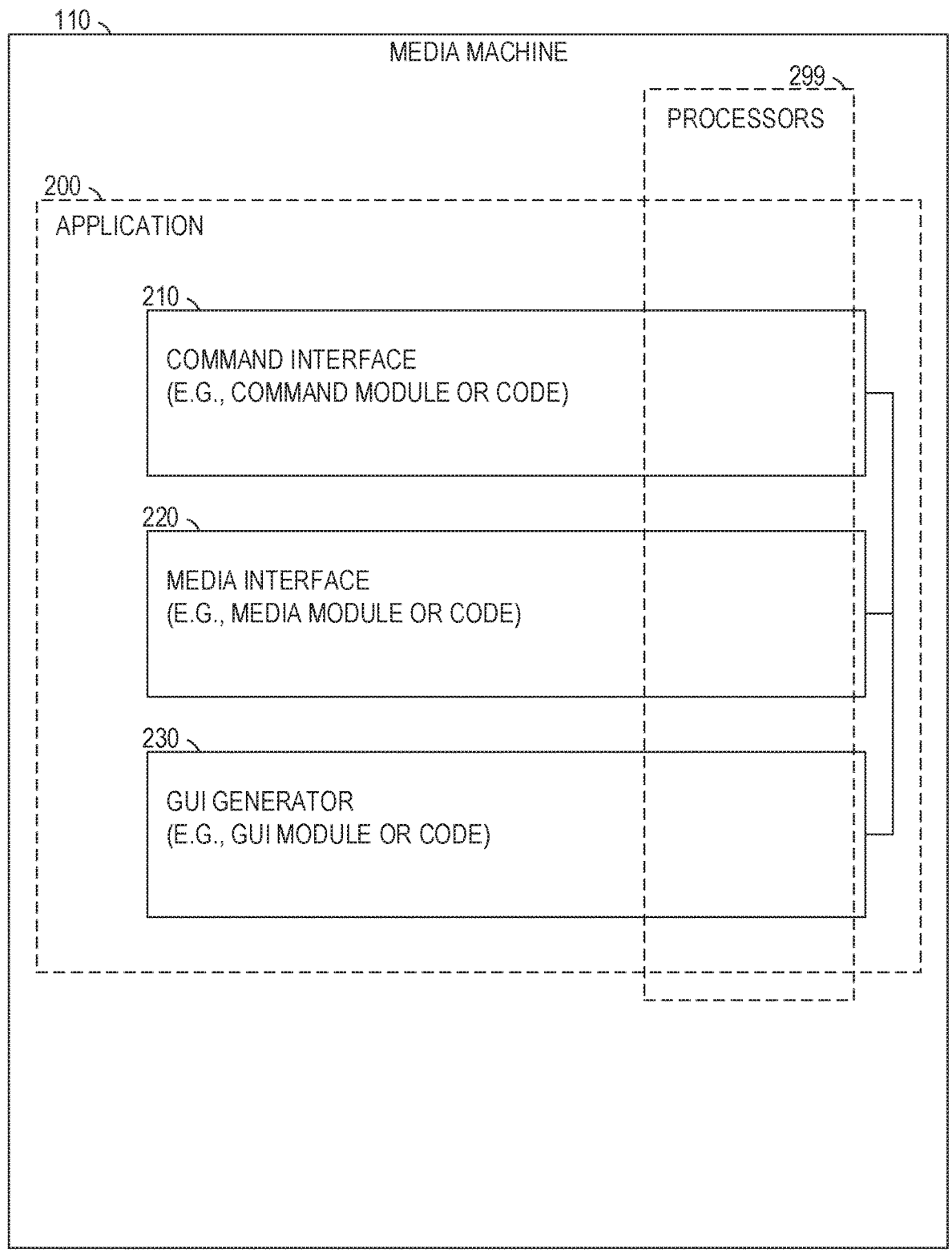
FIG. 2 is a block diagram illustrating components of a media machine, according to some example embodiments.

FIG. 2 is a block diagram illustrating components of the media machine 110, according to some example embodiments. The media machine 110 is shown as including a command interface 210, a media interface 220, and a GUI generator 230, all configured to communicate with each other (e.g., via a bus, shared memory, or a switch). The command interface 210 may be or include a command module or similarly suitable code configured to detect one or more user-operated control operations or other user-submitted commands. The media interface 220 may be or include a media module or similarly suitable code configured to access one or more instances of media content (e.g., as streaming data or as stored files) via the network 190 (e.g., by accessing the database 115). The GUI generator 230 may be or include a GUI module or similarly suitable code configured to generate and provide an interactive GUI, such as an interactive selection GUI, and respond to user-submitted commands by continuing to generate and provide the interactive GUI (e.g., in interest-improved or otherwise modified form).

As shown in FIG. 2, the command interface 210, the media interface 220, and the GUI generator 230 may form all or part of an application 200 (e.g., a server-side application) that is stored (e.g., installed) on the media machine 110 (e.g., responsive to or otherwise as a result of data being received via the network 190). Furthermore, one or more processors 299 (e.g., hardware processors, digital processors, or any suitable combination thereof) may be included (e.g., temporarily or permanently) in the application 200, the command interface 210, the media interface 220, the GUI generator 230, or any suitable combination thereof.

Figure 3:
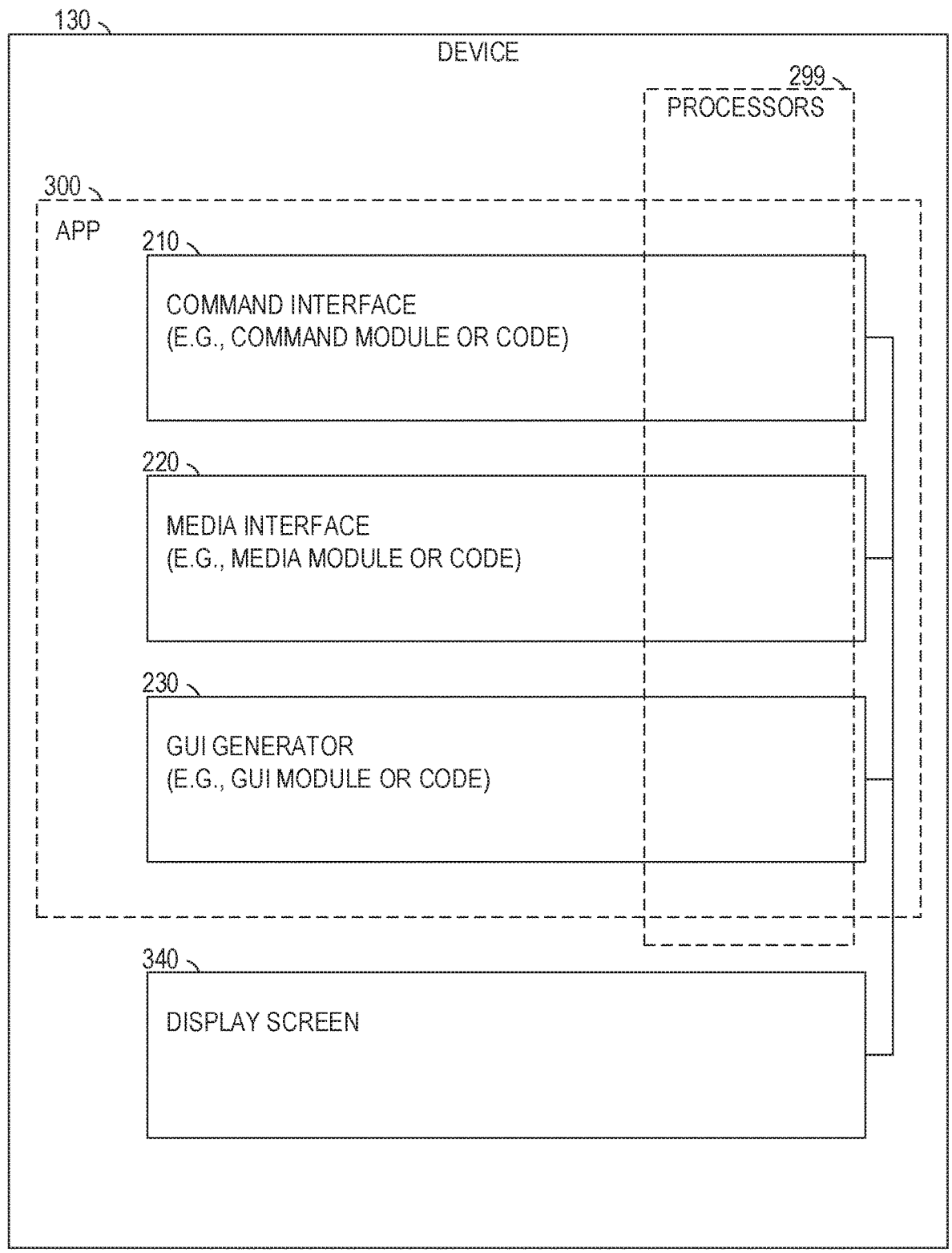
FIG. 3 is a block diagram illustrating components of a device, according to some example embodiments.

FIG. 3 is a block diagram illustrating components of the device 130, according to some example embodiments. The device 130 is shown as including an instance of the command interface 210, an instance of the media interface 220, an instance of the GUI generator 230, and a display screen 340, all configured to communicate with each other (e.g., via a bus, shared memory, or a switch). As shown in FIG. 3, the instance of the command interface 210, the instance of the media interface 220, and the instance of the GUI generator 230 may form all or part of an app 300 (e.g., a client-side app) that is stored (e.g., installed) on the device 130 (e.g., responsive to or otherwise as a result of data being received via the network 190). Furthermore, one or more instances of processors 299 (e.g., hardware processors, digital processors, or any suitable combination thereof) may be included (e.g., temporarily or permanently) in the app 300, the command interface 210, the media interface 220, the GUI generator 230, or any suitable combination thereof Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

FIGS. 4-10 are annotated screenshots illustrating an interactive selection GUI being presented on the display screen 340, according to some example embodiments. Specifically, FIGS. 4-7 sequentially illustrate a transition from one version (e.g., an initial version) of the selection GUI to another version (e.g., an interest-improved version) of the selection GUI, and FIGS. 7-10 sequentially illustrate a further transition from one version (e.g., an initial version or an intermediate version) of the selection GUI to another version (e.g., an interest-improved version or a further interest-improved version) of the selection GUI.

Figure 4:
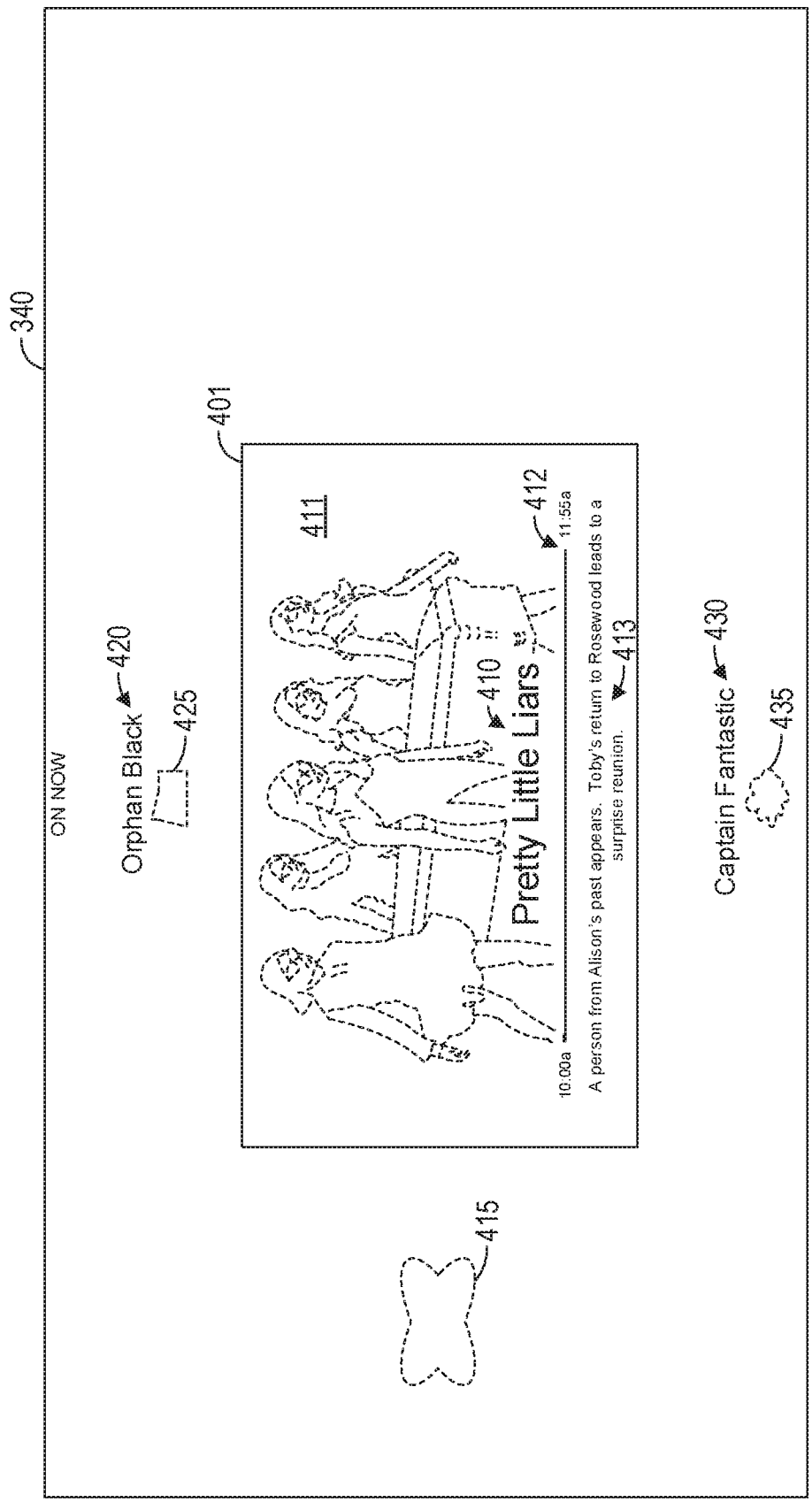
FIGS. 4-10 are annotated screenshots illustrating the selection GUI with synchronized suggestion elements, according to some example embodiments.

As shown in FIG. 4, the selection GUI includes a central window 401. That is, the display screen 340 includes a central portion and a peripheral portion that surrounds the central portion, and the central window 401 of the selection GUI may be aligned with the central portion of the display screen 340. Similarly, the remainder (e.g., a peripheral region) of the selection GUI may be aligned with the peripheral portion of the display screen 340. In some example embodiments, the selection GUI is presented in response to detection of a set of one or more first control operations (e.g., activation of a menu button or a directional button that, in the context of current content being presented, causes presentation of the selection GUI). If such first control operations are detected while current content (e.g., current media content, which may have been previously selected by the user 132) is being presented by the display screen 340, the selection GUI may have the appearance of a video overlay. For example, as part of such a video overlay, the central window 401 may have an opaque appearance and present none of the current content, while some or all of the remainder of the selection GUI may have a translucent appearance and present a darkened version of some of the current content.

In FIG. 4, the central window 401 of the selection GUI is suggesting alternative content (e.g., first alternative media content) by presenting an identifier 410 (e.g., a first identifier) of the alternative content that is being suggested, and the identifier 410 may be a title (e.g., "Pretty Little Liars") or other phrase that identifies the corresponding alternative content. The central window 401 shown in FIG. 4 enhances the suggesting of the alternative content by also presenting a preview 411 (e.g., a first preview) of the alternative content, and the preview 411 may be a static image (e.g., a poster or a banner) or a motion picture (e.g., a looping video segment). In some example embodiments, the preview 411 is a static image temporarily (e.g., 2-5 seconds) while a corresponding motion picture is loading, and after the motion picture has loaded, the preview 411 is a playback (e.g., looped or otherwise repeating) of the loaded motion picture. In FIG. 4, the central window 401 further enhances the suggesting of the alternative content by additionally presenting a timeline 412 (e.g., a first timeline) that corresponds to the alternative content and indicates a playback point within the alternative content, which may have the effect of indicating how much of the alternative content has already been viewed by the user 132, how much of the alternative content remains to be viewed by the user 132, or both. The central window 401 in FIG. 4 further enhances the suggesting of the alternative content by presenting summary text 413 (e.g., first summary text) that corresponds to the alternative content and summarizes the alternative content.

As shown in FIG. 4, the selection GUI may include one or more additional elements outside of the boundaries of the central window 401. Such additional elements include source entity logos 415, 425, and 435, as well as identifiers 420 and 430. The source entity logo 415 (e.g., a first source entity logo) identifies a source entity (e.g., a broadcast media company, a social media company, a cable television network, an entertainment studio, a public television network, or any suitable combination thereof) that corresponds to the alternative content being suggested by the central window 401. Thus, the source entity logo 415 likewise corresponds to the alternative content suggested by the central window 401.

The identifier 420 (e.g., a second identifier) corresponds to other alternative content (e.g., second alternative media content), and the identifier 420 may be a title (e.g., "Orphan Black") or other phrase that identifies the corresponding alternative content. The source entity logo 425 (e.g., a second source entity logo) identifies the source entity that corresponds to the alternative content to which the identifier 420 corresponds. Similarly, the identifier 430 (e.g., a third identifier) corresponds to further alternative content (e.g., third alternative media content), and the identifier 430 may be a title (e.g., "Captain Fantastic") or other phrase that identifies the corresponding alternative content. The source entity logo 435 (e.g., a third source entity logo) identifies the source entity that corresponds to the alternative content to which the identifier 430 corresponds.

Figure 5:
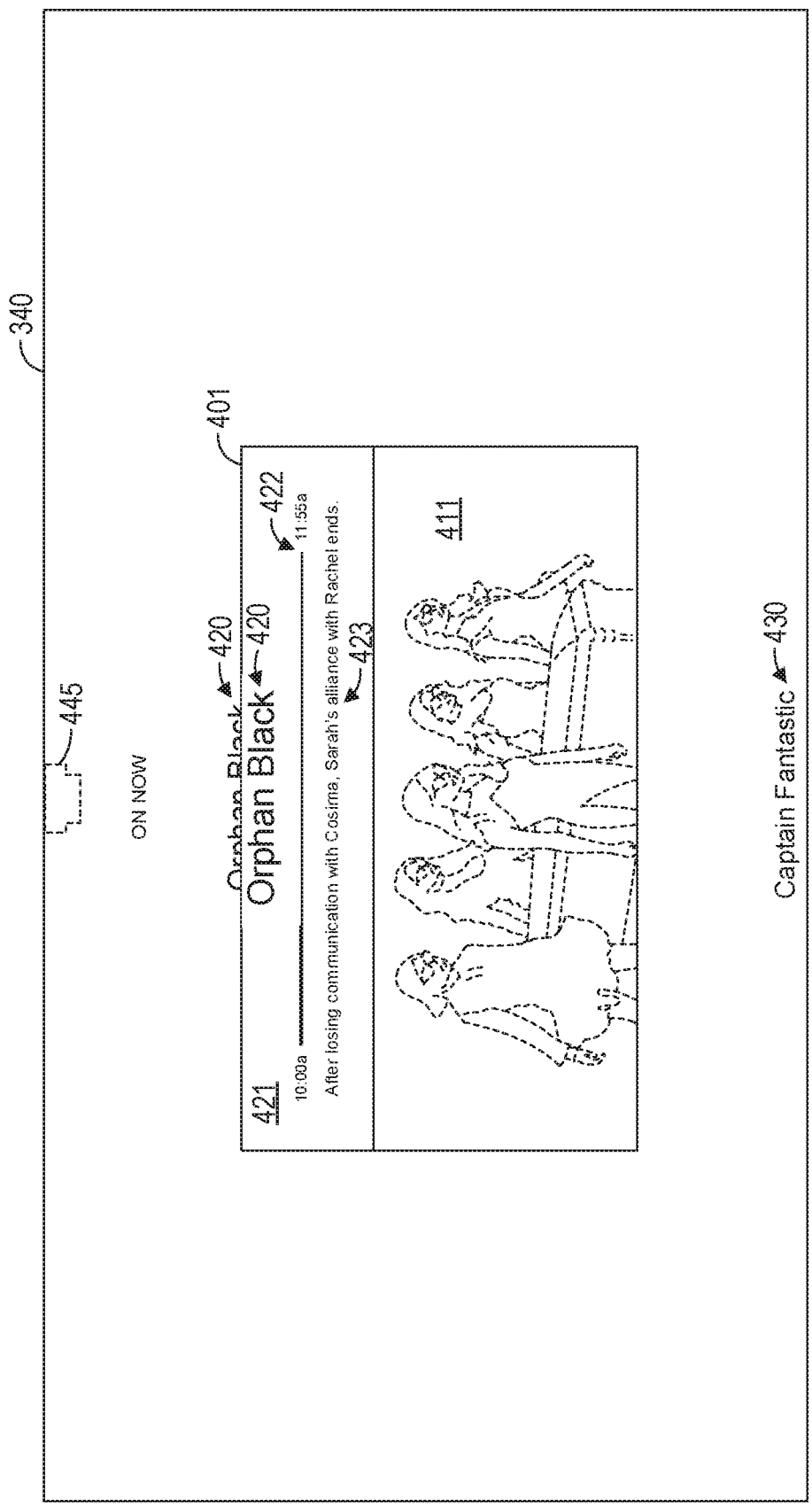

As shown in FIG. 5, the preview 411 (e.g., the first preview) and the identifier 410 (e.g., the first identifier) are sliding out of view within the central window 401 in the same direction (e.g., a shared direction, such as downward relative to the display screen 340) and at the same speed (e.g., a shared speed, which may be constant or non-constant) at which a preview 421 (e.g., a second preview) and the identifier 420 (e.g., the second identifier) are sliding into view within the central window 401. The preview 421 (e.g., the second preview) may be a static image or a motion picture that previews the alternative content (e.g., the second alternative media content) to which the identifier 420 corresponds. In some example embodiments, the preview 421 is briefly a static image for a limited period of time (e.g., 2-5 seconds) while a corresponding motion picture is loading, and after the motion picture has loaded, the preview 421 is a playback (e.g., looped) of the loaded motion picture. Thus, the previews 411 and 421 and the identifiers 410 and 420 are sliding together in the same direction at the same speed within the central window 401. As shown in FIG. 5, the central window 401 spatially truncates (e.g., crops) the previews 411 and 421 and the identifiers 410 and 420 during their synchronized sliding (e.g., in unison).

FIG. 5 also illustrates that the timeline 412 (e.g., the first timeline) and the summary text 413 (e.g., the first summary text) are sliding out of view within the central window 401 in the same direction and at the same speed at which a timeline 422 (e.g., a second timeline) and summary text 423 (e.g., second summary text) are sliding into view within the central window 401. The timeline 422 (e.g., the second timeline) corresponds to the alternative content (e.g., the second alternative media content) to which the identifier 420 corresponds, and the timeline 422 indicates a playback point within that corresponding alternative content, which may have the effect of indicating how much of the corresponding alternative content has already been viewed by the user 132, how much of the corresponding alternative content remains to be viewed by the user 132, or both. The summary text 423 (e.g., the second summary text) corresponds to the alternative content (e.g., the second alternative media content) to which the identifier 420 corresponds, and the summary text 423 summarizes its corresponding alternative content. As shown in FIG. 5, the central window 401 spatially truncates the timelines 412 and 422 and the summary texts 413 and 423 during their synchronized sliding (e.g., in unison with the previews 411 and 421 and the identifiers 410 and 420).

In FIG. 5, the elements outside the central window 401 are also sliding in the same direction as the elements inside the central window 401, and their sliding may occur at the same speed as the elements inside the central window 401. As shown in the top portion of FIG. 5, the source entity logo 425 (e.g., the second source entity logo) has slid out of view (e.g., due to being spatially truncated by the central window 401), and its corresponding identifier 420 (e.g., the second identifier) is similarly in the process of sliding out of view. Additionally, a source entity logo 445 (e.g., a fourth source entity logo) is in the process of sliding into view. As shown in the bottom portion of FIG. 5, the source entity logo 435 (e.g., the third source entity logo) has slid out of view (e.g., off-screen), and its corresponding identifier 430 (e.g., the third identifier) is similarly in the process of sliding out of view.

Figure 6:
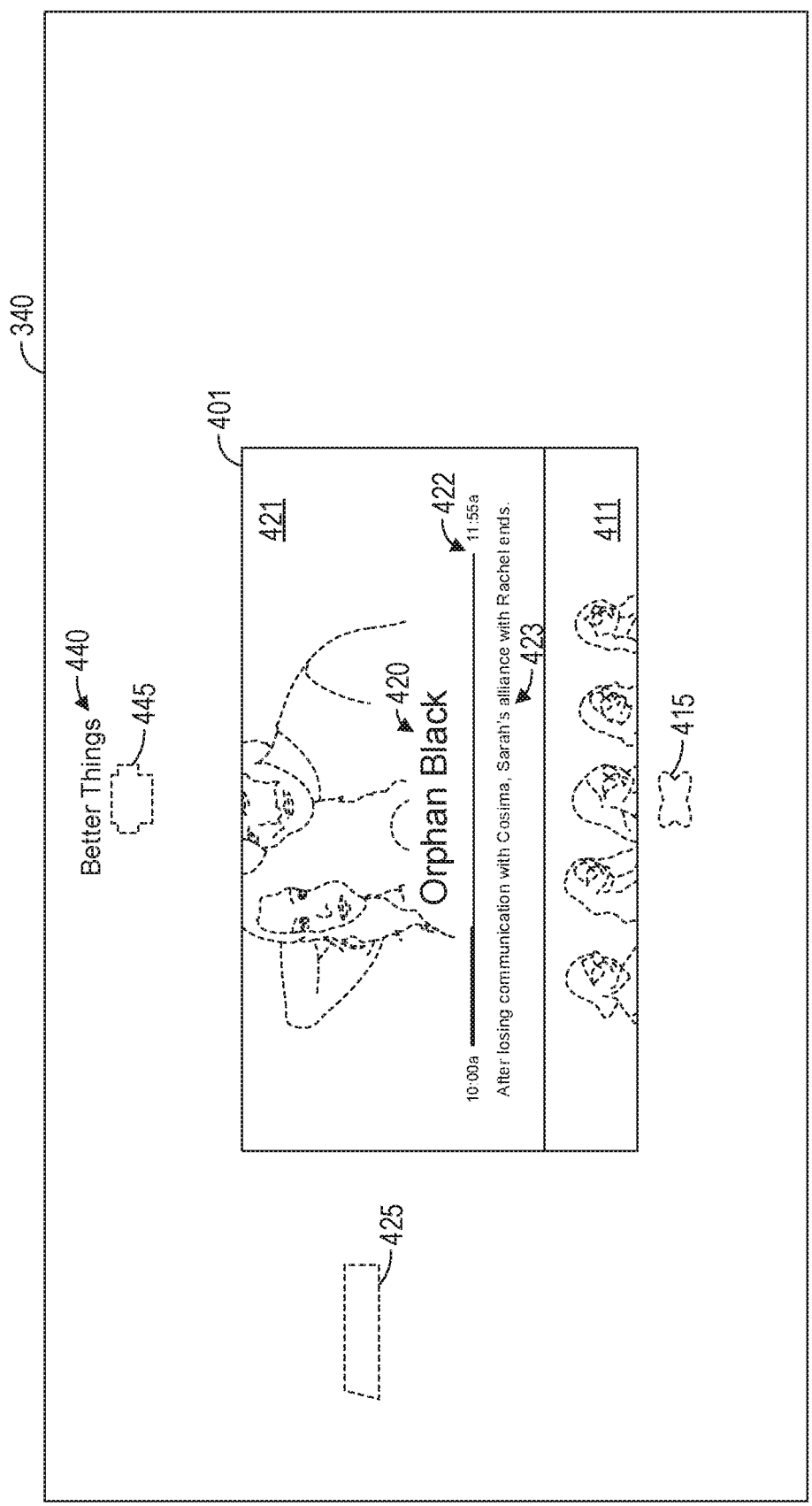

As shown in FIG. 6, the synchronized sliding of the previews 411 and 421, the identifiers 410 and 420, the timelines 412 and 422, and the summary texts 413 and 423 continues in unison at the same shared speed and direction. At the point illustrated in FIG. 6, the identifier 410 (e.g., the first identifier), the timeline 412 (e.g., the first timeline), and the summary text 413 (e.g., the first summary text) have slid out of view within the central window 401 (e.g., due to being spatially truncated by the bottom edge of the central window 401), and almost all of the preview 411 (e.g., the first preview) has slid out of view within the central window 401.

In contrast, at the point illustrated in FIG. 6, the identifier 420 (e.g., the second identifier), the timeline 422 (e.g., the second timeline), and the summary text 423 (e.g., the second summary text) have fully slid into view within the central window 401 (e.g., after previously being spatially truncated by the top edge of the central window 401), and almost all of the preview 421 (e.g., the second preview) has similarly slid into view within the central window 401.

As shown in FIG. 6, the selection GUI may present accompanying movements to elements outside the central window 401. For example, the source entity logo 435 (e.g., the third source entity logo) has slid out of view, and a source entity logo 415 (e.g., the first source entity logo) is sliding into view. The sliding of the source entity logos 415 and 435 may occur in the same direction as the elements inside the central window 401, at the same speed as the elements inside the central window 401, or both. As shown in the top portion of FIG. 6, a source entity logo 445 (e.g., the fourth source entity logo) and an identifier 440 (e.g., a fourth identifier) has slid into view and may continue to slide further toward respective ending positions within the selection GUI. This may occur in the same direction as the elements inside the central window 401, at the same speed as the elements inside the central window 401, or both. Furthermore, on the left portion of FIG. 6, the source entity logo 425 is in the process of sliding into view (e.g., as a replacement for the source entity logo 415 that previously occupied that location in the selection GUI). This may also be performed in the same direction as the elements in the central window 401, at the same speed as the elements in the central window 401, or both.

According to various example embodiments, one aggregated (e.g., cumulative) effect of this transition is to preserve visual-spatial relationships among the synchronously sliding elements (e.g., suggestion elements) in the eyes and mind of the user 132, which may provide various benefits including maintenance of mental context within the short-term memory of the user 132 (e.g., such that the user 132 can more easily recall presented suggestions, plan navigation paths to a suggestion previously seen, and execute an efficient set of control operations to traverse a navigation path to that suggestion).

Figure 7:
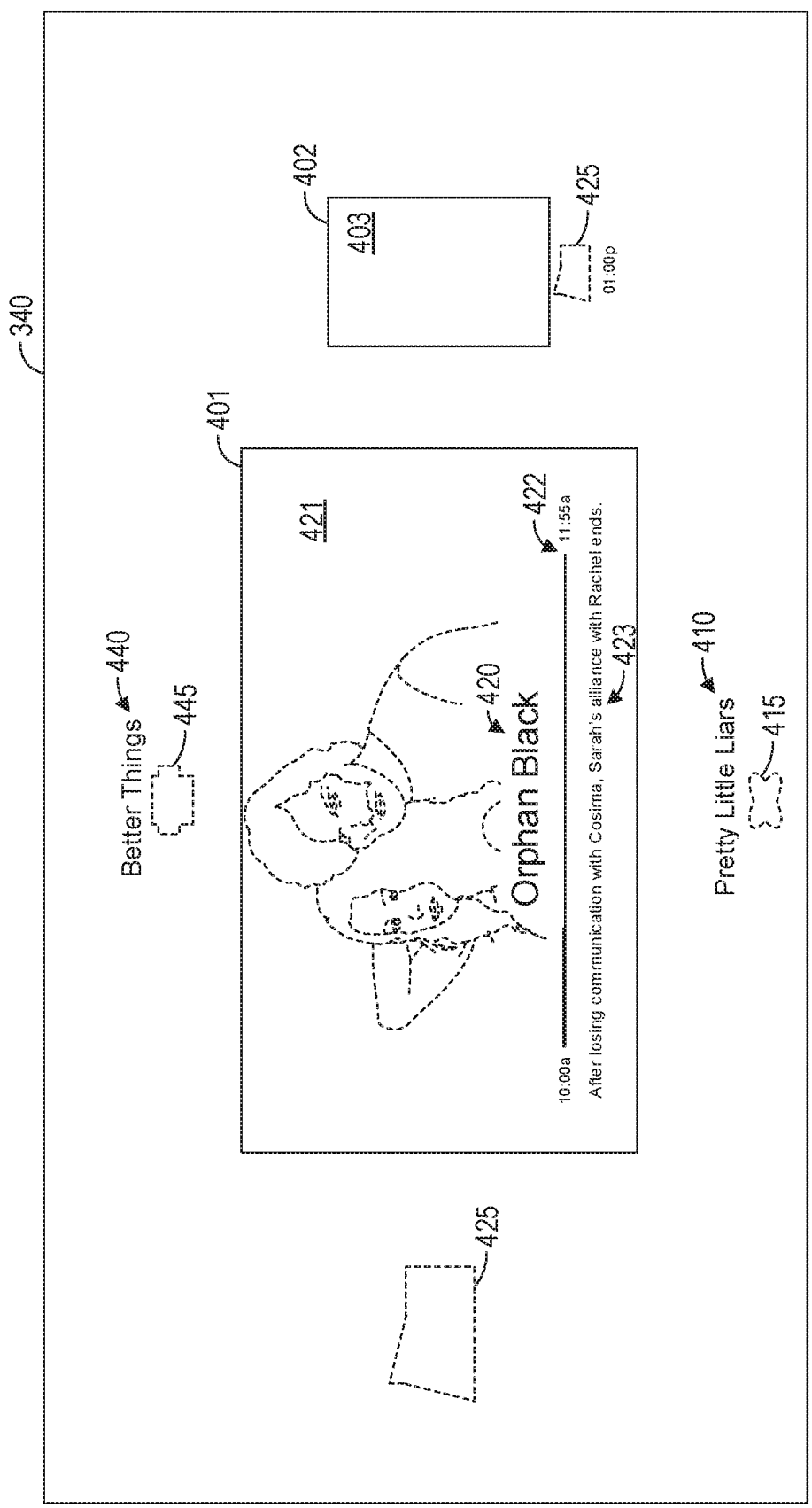

As shown in FIG. 7, the synchronized in-unison sliding of the previews 411 and 421, the identifiers 410 and 420, the timelines 412 and 422, and the summary texts 413 and 423 has completed, as well as the sliding of the source entity logo 425 (e.g., the second source entity logo) to replace the source entity logo 415 (e.g., the first source entity logo) in the left portion of the selection GUI. At the point illustrated in FIG. 7, the central window 401 of the selection GUI is suggesting the alternative content (e.g., the second alternative media content) to which the identifier 420 (e.g., the second identifier), the preview 421 (e.g., the second preview), the timeline 422 (e.g., the second timeline), and the summary text 423 (e.g., the second summary text) all correspond. Furthermore, at this point, the source entity logo 425 identifies the source entity that corresponds to the alternative content (e.g., the second alternative media content) now being suggested by the central window 401.

As shown in the top portion of FIG. 7, the source entity logo 445 (e.g., the fourth source entity logo) and the identifier 440 (e.g., the fourth identifier) have also slid into view and come to rest within the selection GUI (e.g., at positions outside the central window 401 previously occupied by the identifier 420 and the source entity logo 425). As shown in the right side portion of FIG. 7, some example embodiments of the selection GUI further include an appearance (e.g., sliding or instantaneous) of a recommendation window 402. The recommendation window 402 may present a portion 403 (e.g., static portion) of a preview that corresponds to still further alternative content, and the recommendation window 402 may be accompanied by an instance (e.g., a small instance relative to other instances on-screen) of the source entity logo 425 (e.g., the second source entity logo). In certain example embodiments, the appearance of the recommendation window 402 on the right-hand side of the central window 401 indicates that the alternative content to which the portion 403 of the preview corresponds has been selected for the user 132 (e.g., by a suitable recommendation engine) and is available to be selected by the user 132.

In some situations, the appearance of the selection GUI as shown in FIG. 7 may serve as a starting point for a transition from one version (e.g., an initial version) of the selection GUI to another version (e.g., an interest-improved version) of the selection GUI. Accordingly, as shown in FIG. 7, the central window 401 is suggesting alternative content (e.g., first alternative media content) by presenting the identifier 420 (e.g., a first identifier, in this context) of the alternative content that is being suggested, and the identifier 420 may be a title (e.g., "Orphan Black") or other phrase that identifies the corresponding alternative content. The central window 401 shown in FIG. 7 enhances the suggesting of the alternative content by also presenting the preview 421 (e.g., a first preview, in this context) of the alternative content, and the preview 421 may be a static image or a motion picture. In some example embodiments, the preview 421 is a static image temporarily (e.g., 2-5 seconds) while a corresponding motion picture is loading, and after the motion picture has loaded, the preview 421 is a playback of the loaded motion picture. In FIG. 7, the central window 401 further enhances the suggesting of the alternative content by additionally presenting the timeline 422 (e.g., a first timeline, in this context) that corresponds to the alternative content and indicates a playback point within the alternative content, which may have the effect of indicating how much of the alternative content has already been viewed by the user 132, how much of the alternative content remains to be viewed by the user 132, or both. The central window 401 in FIG. 7 further enhances the suggesting of the alternative content by presenting summary text 423 (e.g., first summary text, in this context) that corresponds to the alternative content and summarizes the alternative content.

As shown in FIG. 7, the selection GUI may include one or more additional elements outside of the boundaries of the central window 401. Such additional elements include source entity logos 415, 425, and 445, identifiers 410, and 440, and the recommendation window 402. The source entity logo 425 (e.g., a first source entity logo) identifies a source entity that corresponds to the alternative content being suggested by the central window 401. Thus, the source entity logo 425 likewise corresponds to the alternative content suggested by the central window 401.

Figure 8:
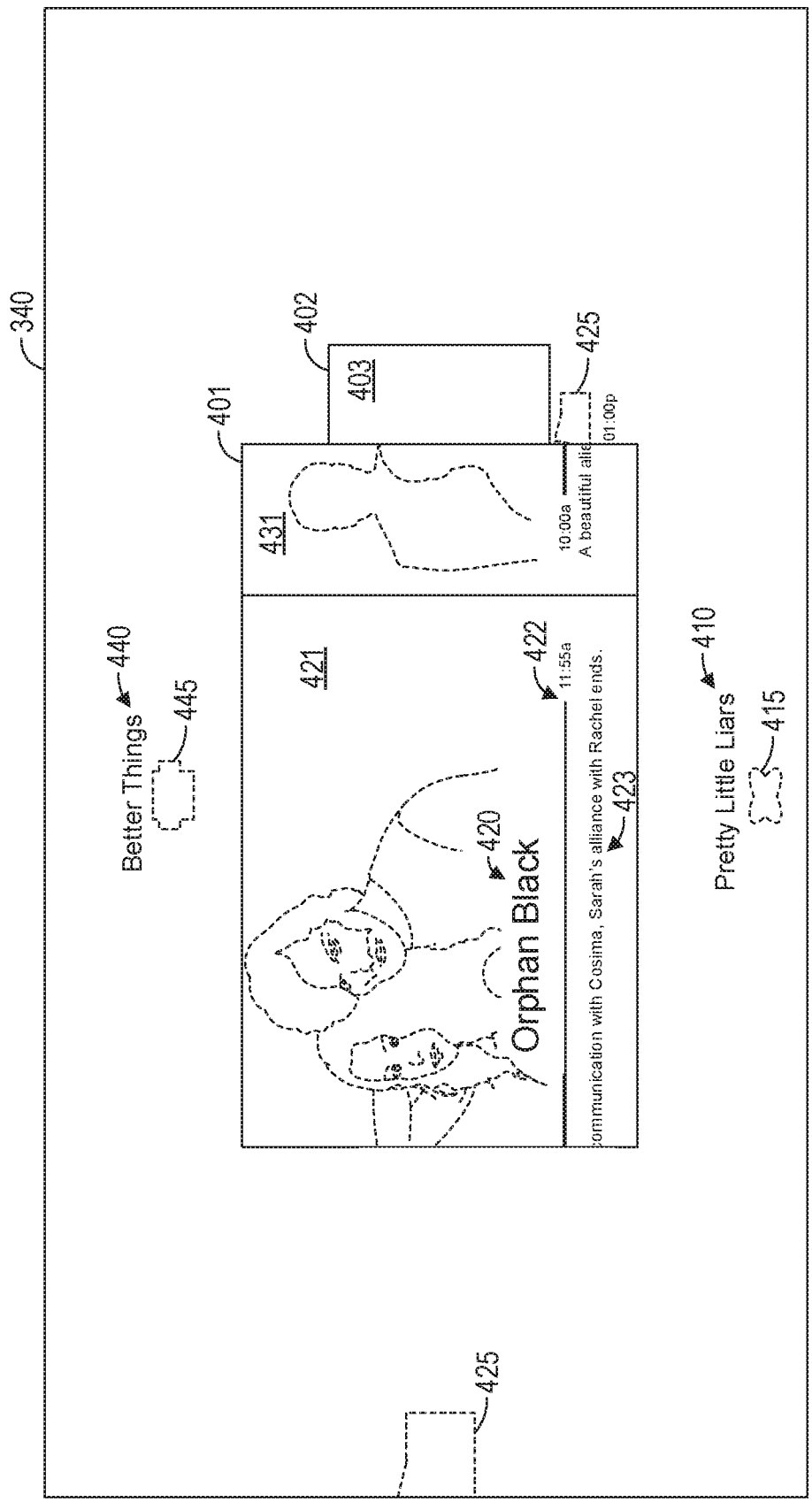

As shown in FIG. 8, the preview 421 (e.g., the first preview) and the identifier 420 (e.g., the first identifier) are sliding out of view within the central window 401 in the same direction (e.g., a shared direction, such as leftward relative to the display screen 340) and at the same speed (e.g., a shared speed, which may be constant or non-constant) at which a preview 431 (e.g., a second preview) is sliding into view within the central window 401. In some example embodiments, a corresponding identifier 430 (e.g., a second identifier) is also in the process of sliding into view within the central window 401 (e.g., not yet visible, but soon-to-be visible, as in FIG. 9). The preview 431 (e.g., the second preview) may be a static image or a motion picture that previews the alternative content (e.g., the second alternative media content) to which the identifier 430 corresponds. In some example embodiments, the preview 431 is briefly a static image for limited period of time (e.g., 2-5 seconds) while a corresponding motion picture is loading, and after the motion picture has loaded, the preview 431 is a playback (e.g., looped) of the loaded motion picture. Thus, the previews 421 and 431 and the identifiers 420 and 430 are sliding together in the same direction at the same speed within the central window 401. As shown in FIG. 8, the central window 401 spatially truncates (e.g., crops) the previews 421 and 431 and the identifiers 420 and 430 during their synchronized sliding (e.g., in unison).

Figure 9:
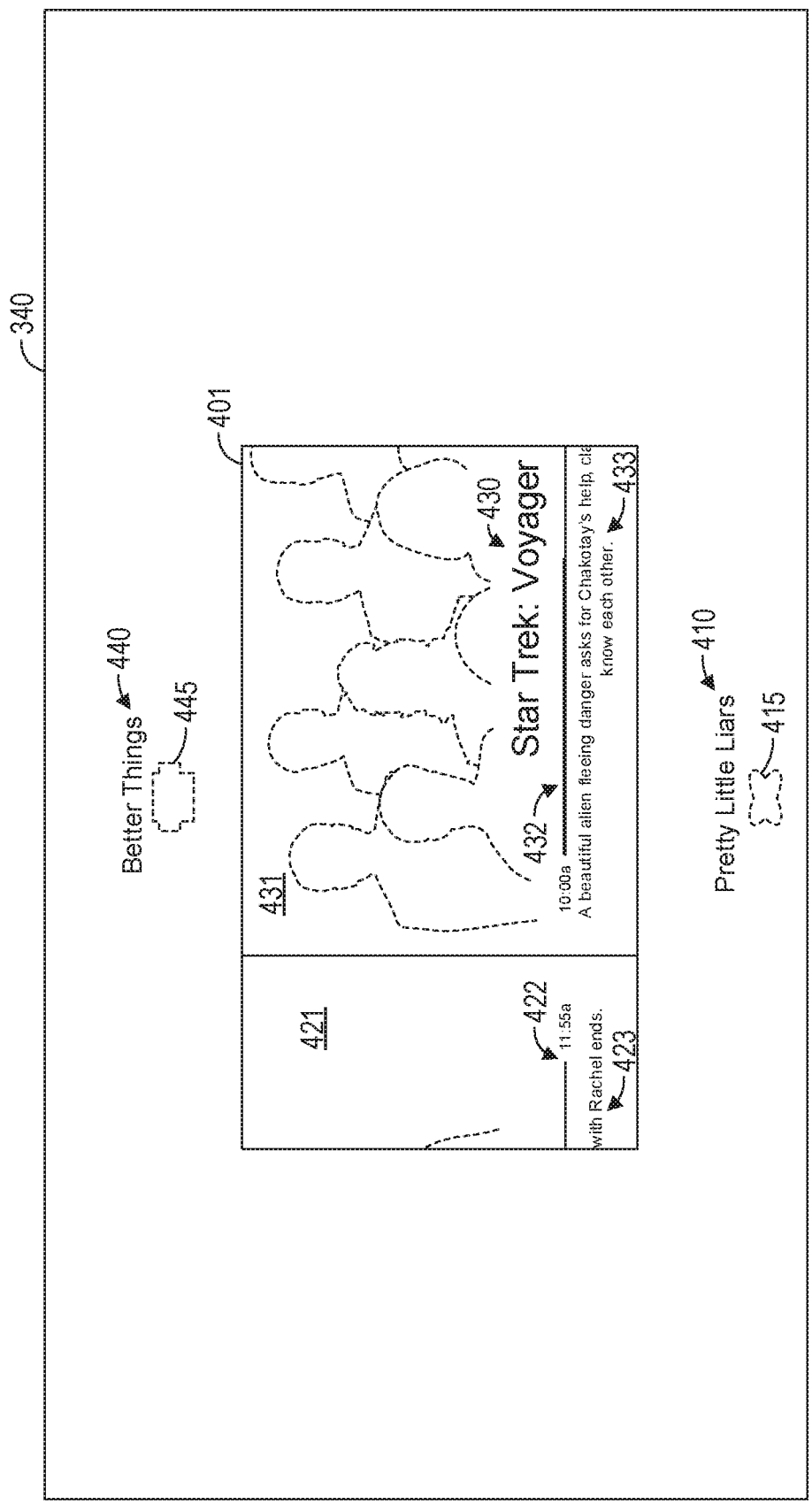

FIG. 8 and FIG. 9 illustrate that the timeline 422 (e.g., the first timeline) and the summary text 423 (e.g., the first summary text) are sliding out of view within the central window 401 in the same direction and at the same speed at which a timeline 432 (e.g., a second timeline) and summary text 433 (e.g., second summary text) are sliding into view within the central window 401. The timeline 432 (e.g., the second timeline) corresponds to the alternative content (e.g., the second alternative media content) to which the identifier 430 corresponds, and the timeline 432 indicates a playback point within that corresponding alternative content, which may have the effect of indicating how much of the corresponding alternative content has already been viewed by the user 132, how much of the corresponding alternative content remains to be viewed by the user 132, or both. The summary text 433 (e.g., the second summary text) corresponds to the alternative content (e.g., the second alternative media content) to which the identifier 430 corresponds, and the summary text 433 summarizes its corresponding alternative content. As shown in FIG. 8 and FIG. 9, the central window 401 spatially truncates the timelines 422 and 432 and the summary texts 423 and 433 during their synchronized sliding (e.g., in unison with the previews 421 and 431 and the identifiers 420 and 430).

As shown in FIG. 9, the synchronized sliding of the previews 421 and 431, the identifiers 420 and 430, the timelines 422 and 432, and the summary texts 423 and 433 continues in unison. At the point illustrated in FIG. 9, the identifier 420 (e.g., the first identifier) has slid out of view within the central window 401 (e.g., due to being spatially truncated by the left edge of the central window 401), and almost all of the timeline 422 (e.g., the first timeline), the summary text 423 (e.g., the first summary text), and the preview 421 (e.g., the first preview) has slid out of view within the central window 401.

In contrast, at the point illustrated in FIG. 9, the identifier 430 (e.g., the second identifier) has fully slid into view within the central window 401 (e.g., after previously being spatially truncated by the right edge of the central window 401), and almost all of the timeline 432 (e.g., the second timeline), the summary text 433 (e.g., the second summary text), and the preview 431 (e.g., the second preview) has slid into view within the central window 401.

According to various example embodiments, one aggregated (e.g., cumulative) effect of the this transition is to preserve visual-spatial relationships among the synchronously sliding elements (e.g., suggestion elements) in the eyes and mind of the user 132, which may provide various benefits including maintenance of mental context within the short-term memory of the user 132 (e.g., such that the user 132 can more easily recall presented suggestions, plan navigation paths to a suggestion previously seen, and execute an efficient set of control operations to traverse a navigation path to that suggestion).

Figure 10:
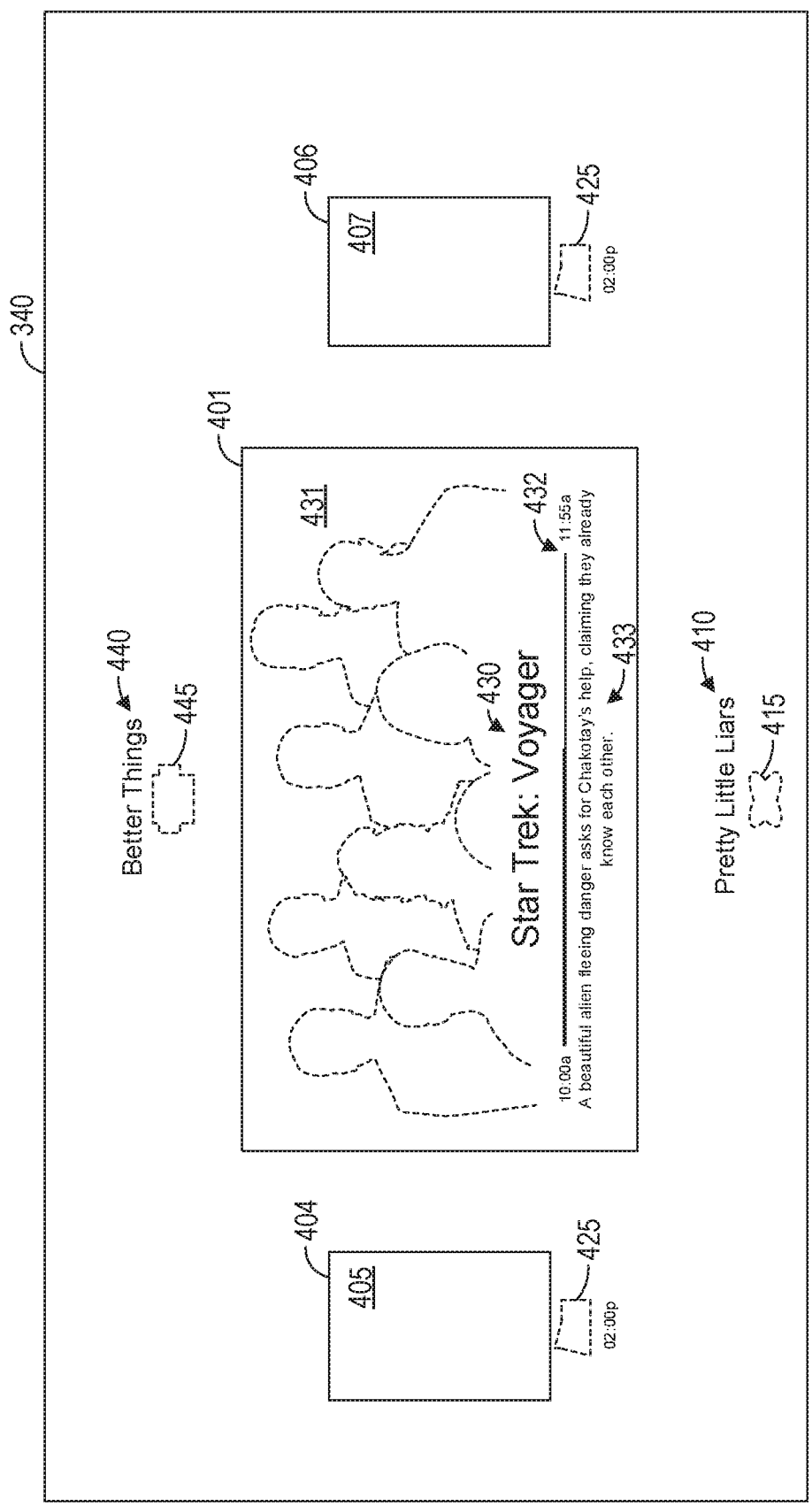

As shown in FIG. 10, the synchronized in-unison sliding of the previews 421 and 431, the identifiers 420 and 430, the timelines 422 and 432, and the summary texts 423 and 433 has finished. At the point illustrated in FIG. 10, the central window 401 of the selection GUI is suggesting the alternative content (e.g., the second alternative media content) to which the identifier 430 (e.g., the second identifier) the preview 431 (e.g., the second preview), the timeline 432 (e.g., the second timeline), and the summary text 433 (e.g., the second summary text) all correspond.

As shown in the left portion of FIG. 10, some example embodiments of the selection GUI also include an appearance (e.g., sliding or instantaneous) of a history window 404. The history window 404 may present a portion 405 (e.g., static portion) of the preview 421 (e.g., the first preview) that no longer appears in the central window 401, and the history window 404 may be accompanied by an instance (e.g., a small instance relative to other instances on-screen) of the source entity logo 425 (e.g., the first source entity logo). In certain example embodiments, the appearance of the history window 404 on the left side of the central window 401 indicates that the alternative content to which the portion 405 corresponds has been recently viewed by the user 132 and is available to be re-selected by the user 132. In various example embodiments, the appearance of the history window 404 on the left side of the central window 401 indicates that the alternative content to which the portion 405 corresponds has been recently suggested to the user 132 and is available to be re-selected by the user 132. In hybrid example embodiments, the appearance of the history window 404 on the left side of the central window 401 indicates either situation.

As shown in the right side portion of FIG. 10, some example embodiments of the selection GUI further include an appearance (e.g., sliding or instantaneous) of a recommendation window 406 (e.g., a further recommendation window beyond the recommendation window 402 shown in FIG. 7). The recommendation window 406 may present a portion 407 (e.g., static portion) of a preview that corresponds to even further alternative content, and the recommendation window 406 may be accompanied by an instance (e.g., a small instance relative to other instances on-screen) of the source entity logo 425 (e.g., the first source entity logo). In certain example embodiments, the appearance of the recommendation window 402 on the right side of the central window 401 indicates that the alternative content to which the portion 407 corresponds has been selected for the user 132 (e.g., by a suitable recommendation engine) and is available to be selected by the user 132.

Figure 11:
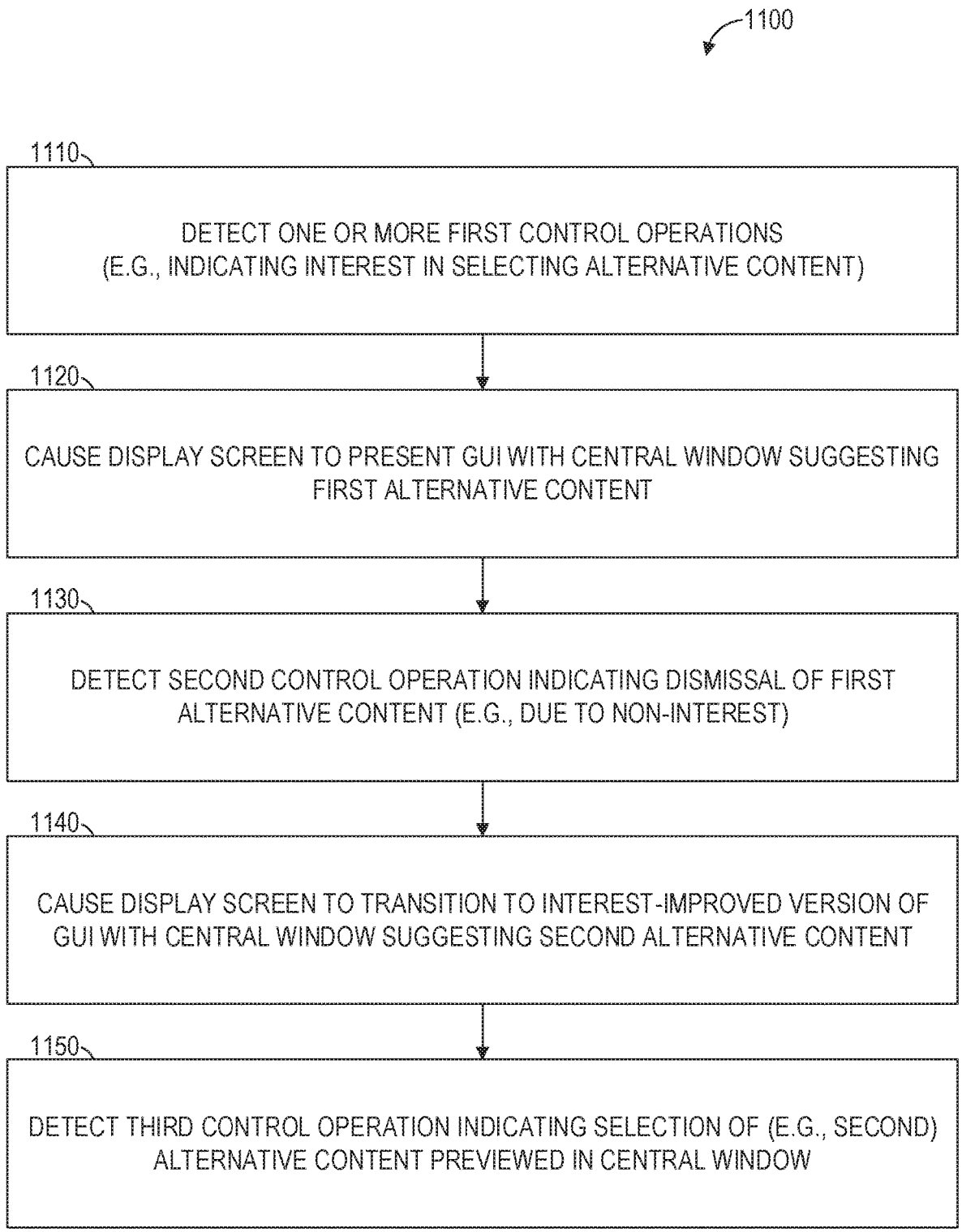
FIGS. 11-14 are flowcharts illustrating operations performing a method of generating and providing a selection GUI with synchronized suggestion elements, according to some example embodiments.

FIGS. 11-14 are flowcharts illustrating operations performing a method 1100 of generating and providing a selection GUI with synchronized suggestion elements, according to some example embodiments. Operations in the method 1100 may be performed by the device 130, the media machine 110, or both, using components (e.g., modules) described above with respect to FIG. 2 and FIG. 3, using one or more processors (e.g., microprocessors or other hardware processors), or using any suitable combination thereof. As shown in FIG. 11, the method 1100 includes one or more of operations 1110, 1120, 1130, 1140, and 1150.

In operation 1110, the command interface 210 detects a set of first control operations. As noted above, this detection may occur during presentation of current content (e.g., current media content, such as a currently playing movie or television show) on the display screen 340. In some example embodiments, this detection includes receiving one or more signals that indicate activation of a menu button or a directional button (e.g., on the device 130 or a companion device thereof) that, in the context of current content being presented on the display screen 340, causes presentation of the selection GUI on the display screen 340 (e.g., as an overlay interface contemporaneously with the presentation of the current content).

In operation 1120, the GUI generator 230 responds to the detected set of first control operations by causing the display screen 340 to present the selection GUI. As noted above (e.g., with respect to FIG. 4 or FIG. 7), the central window 401 of the selection GUI suggests first alternative content (e.g., first alternative media content) by presenting a first preview thereof and a first identifier thereof superimposed on the first preview. According to various example embodiments, the first preview, the first identifier, or both may be accessed from the database 115 by the media interface 220 and provided to the GUI generator 230 for generating the selection GUI and including the first preview and the first identifier in the central window 401 of the selection GUI. The generated selection GUI, with its central window 401 presenting the first preview and the first identifier, may accordingly be provided to the display screen 340 (e.g., via the device 130) for presentation thereon.

In operation 1130, the command interface 210 detects a second control operation that indicates dismissal of the suggested first alternative content (e.g., due to temporary or persistent non-interest by the user 132 in the first alternative content). In certain example embodiments, this detection includes receiving one or more signals that indicate an activation of a directional button (e.g., on the device 130 or a companion device thereof). For example, the second control operation may be an activation of a downward directional button that triggers the selection GUI to perform the transition illustrated and discussed above with respect to FIGS. 4-7. As another example, the second control operation may be an activation of a rightward directional button that triggers the selection GUI to perform the transition illustrated and discussed above with respect to FIGS. 7-10.

In operation 1140, the GUI generator 230 responds to the detected second control operation by causing the display screen to present a transition to an interest-improved version of the selection GUI. As noted above with respect to FIGS. 4-7 or with respect to FIGS. 7-10, the transition to the interest-improved version of the selection GUI includes at least two things: (1) sliding (e.g., scrolling) the first preview, the first identifier, a second preview, and a second identifier together in a shared direction and at a shared speed within the central window 401, where the central window 401 spatially truncates the first preview sliding out of view and spatially truncates the second preview sliding into view, and where the second preview and the second identifier correspond to second alternative content; and (2) presenting the interest-improved version of the selection GUI in which the central window 401 suggests the second alternative content by presenting the second preview and the second identifier superimposed thereon.

In operation 1150, the command interface 210 detects a third control operation that indicates selection of the second alternative content suggested by the central window 401 in the interest-improved version of the selection GUI. In various example embodiments, the detection of the third control operation includes receiving one or more signals that indicate an activation of a selection button (e.g., on the device 130 or a companion device thereof). According to some example embodiments, as part of performing operation 1150, the command interface 210 additionally responds to the detected third control operation by causing the display screen 340 to initiate a presentation of the selected second alternative content (e.g., instead of the current content).

Figure 12:
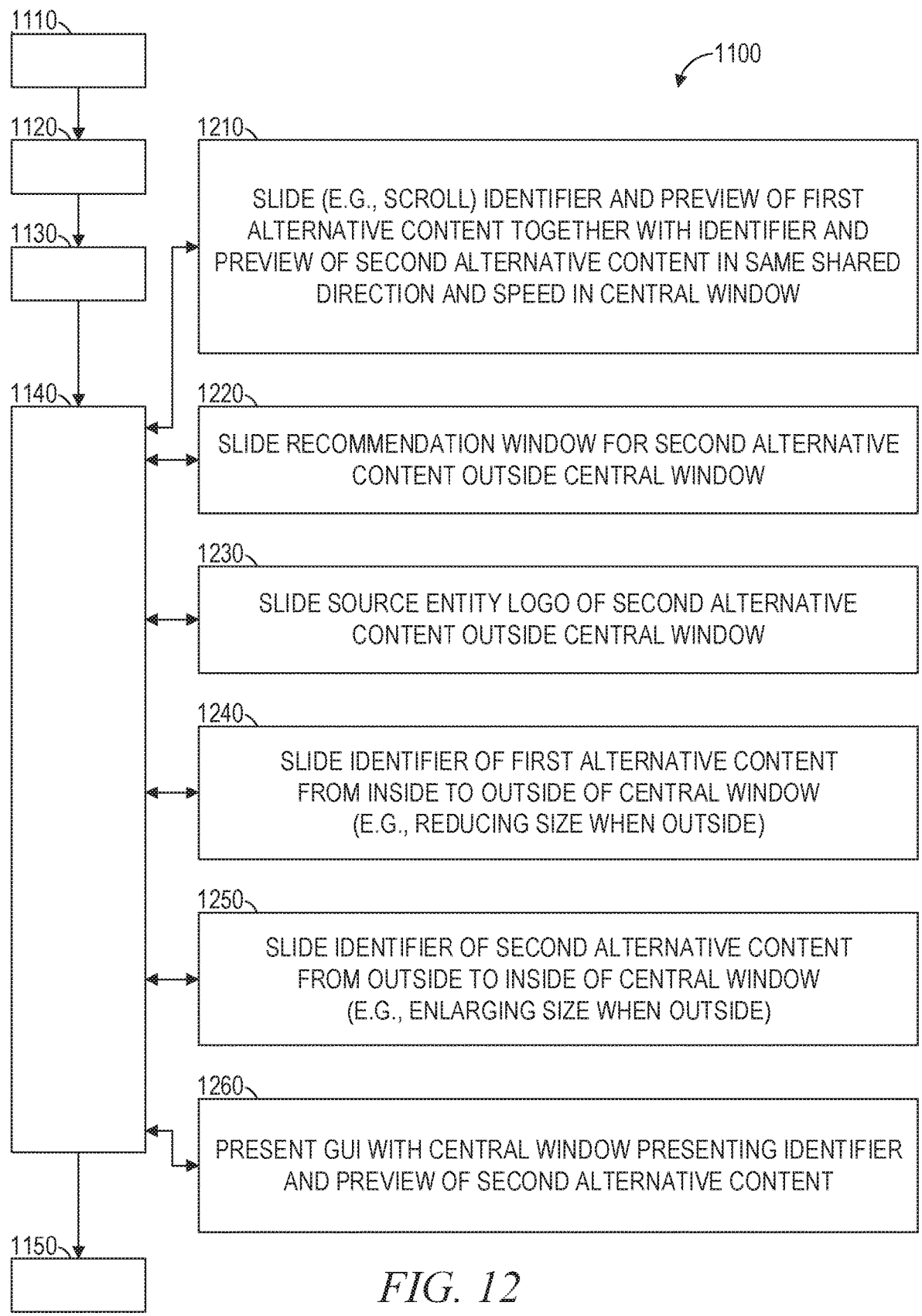

As shown in FIG. 12, in addition to any one or more of the operations previously described, the method 1100 may include one or more of operations 1210, 1220, 1230, 1240, 1250, and 1260, any one or more of which may be performed as part (e.g., a subroutine or a portion) of operation 1140, in which the GUI generator 230 causes the display screen 340 to present a transition to the interest-improved version of the selection GUI.

In operation 1210, the presented transition includes sliding the identifier and preview of the first alternative content (e.g., the identifier 410 and the preview 411, which may be considered the first identifier and the first preview) together with the identifier and preview of the second alternative content (e.g., the identifier 420 in the preview 421, which may be considered the second identifier and the second preview) in the same shared direction and at the same shared speed within the central window 401. The central window 401 may spatially truncate any one or more of these sliding elements as each element respectively slides into view or out of view. In corresponding operation 1260, within the interest-improved version of the selection GUI, the central window 401 suggests the second alternative content by presenting the identifier and preview of the second alternative content (e.g., the second identifier and the second preview).

As noted above, the second control operation that indicates dismissal of the suggested first alternative content may be an activation of a directional button. In some example embodiments, the directional control corresponds to a direction that matches the shared direction in which the identifiers and previews are slid in operation 1210. Thus, an activation of a downward directional button may trigger the selection GUI to perform the transition illustrated and discussed above with respect to FIGS. 4-7, which illustrate the identifiers and previews moving downward relative to the display screen 340. In certain example embodiments, the directional control corresponds to a direction that opposes the shared direction in which the identifiers and previews are slid in operation 1210. Accordingly, an activation of a rightward directional button may trigger the selection GUI to perform the transition illustrated and discussed above with respect to FIGS. 7-10, which illustrate the identifiers and previews moving leftward relative to the display screen 340.

In operation 1220, the presented transition includes sliding a recommendation window (e.g., the recommendation window 402) outside the central window 401, toward the central window 401, and then out of view within the selection GUI. The recommendation window presents a spatial portion (e.g., a cropped portion) of the preview (e.g., the second preview) of the second alternative content, and the central window 401 spatially truncates the recommendation window as the recommendation window slides out of view. The sliding of the recommendation window toward the central window 401 may be performed in the same shared direction as the sliding of the identifiers and previews discussed above with respect to operation 1210, at the same shared speed as those identifiers and previews, or both. In alternative example embodiments, the sliding of the recommendation window toward the central window 401 is performed in a direction perpendicular to the shared direction.

In operation 1230, the presented transition includes sliding a logo, such as a source entity logo (e.g., the source entity logo 425, which may be considered a second source entity logo), outside the central window 401, toward the central window 401, and then out of view within the selection GUI. For example, the logo may be an instance of the source entity logo 425 (e.g., as illustrated in the top portions of FIGS. 4-7), which may identify a source entity of the second alternative content. This logo may be slid in unison with the sliding of the recommendation window in operation 1220. Accordingly, the central window 401 may spatially truncate the logo as the logo slides out of view. Furthermore, the sliding of the logo toward the central window 401 may be performed in the same shared direction as the sliding of the identifiers and previews discussed above with respect to operation 1210, at the same shared speed as those identifiers and previews, or both. In alternative example embodiments, the sliding of the logo toward the central window 401 is performed in a direction perpendicular to the shared direction.

In operation 1240, the presented transition includes sliding the identifier of the first alternative content (e.g., the identifier 410 or 420, which may be considered the first identifier) from inside the central window 401 to outside the central window 401. This may have the effect of providing a reminder regarding the previously suggested first alternative content by presenting the identifier of the first alternative content outside the central window 401. In some example embodiments, the sliding of the identifier of the first alternative content includes reducing the font size of the identifier (e.g., a first font size of the first identifier) when the identifier is outside the central window 401. Furthermore, the sliding of the identifier (e.g., the first identifier) outside of the central window 401 may be performed in the same shared direction as the sliding of the identifiers and previews discussed above with respect to operation 1210, at the same shared speed as those identifiers and previews, or both.

In operation 1250, the presented transition includes sliding the identifier of the second alternative content (e.g., the identifier 420 or 430, which may be considered the second identifier) from outside the central window 401 into the central window 401. In some example embodiments, this includes enlarging the font size of the identifier (e.g., a second font size of the second identifier) when the identifier is outside the central window 401. Furthermore, the sliding of the identifier (e.g., the second identifier) outside of the central window 401 may be performed in the same shared direction as the sliding of the identifiers and previews discussed above with respect to operation 1210, at the same shared speed as those identifiers and previews, or both.

Figure 13:
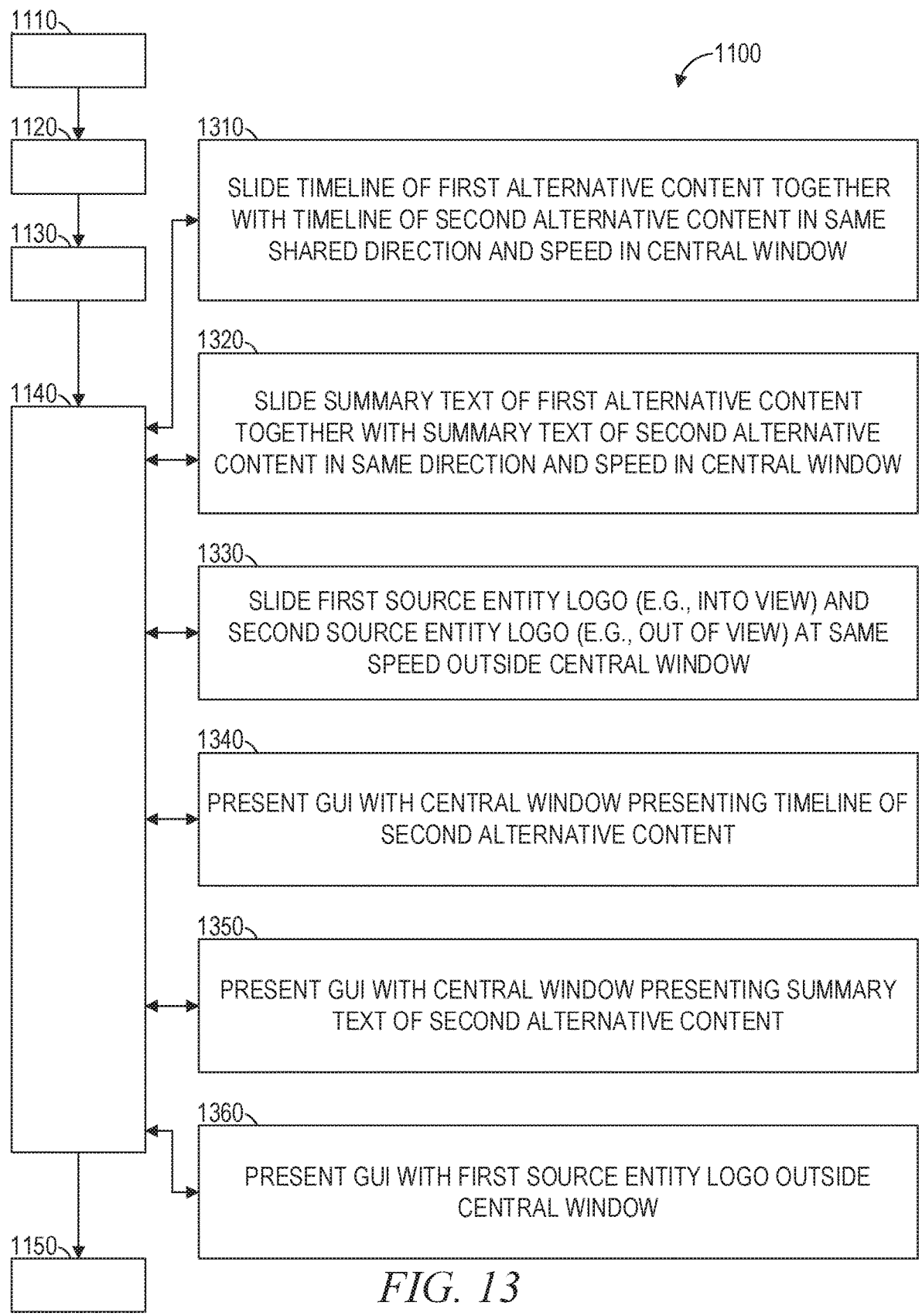

As shown in FIG. 13, in addition to any one or more of the operations previously described, the method 1100 may include one or more of operations 1310, 1320, 1330, 1340, 1350, and 1360, any one or more of which may be performed as part (e.g., a subroutine or a portion) of operation 1140, in which the GUI generator 230 causes the display screen 340 to transition to the interest-improved version of the selection GUI.

In operation 1310, the presented transition includes sliding the timeline of the first alternative content (e.g., the timeline 412 or 422, which may be considered the first timeline) together with the timeline of the second alternative content (e.g., the timeline 422 or 432, which may be considered the second timeline) in the same shared direction and at the same shared speed within the central window 401. The central window 401 may spatially truncate either or both of these sliding elements as each element respectively slides into view or out of view. In corresponding operation 1340, within the interest-improved version of the selection GUI, the central window 401 enhances its suggestion of the second alternative content by presenting the timeline of the second alternative content (e.g., the second timeline). The timeline may be presented superimposed (e.g., as an overlay) on the corresponding preview (e.g., the second preview) of the second alternative content.

In operation 1320, the presented transition includes sliding the summary text of the first alternative content (e.g., the summary text 413 or 423, which may be considered the first summary text) together with the summary text of the second alternative content (e.g., the summary text 423 or 433, which may considered the second summary text) in the same shared direction and at the same shared speed within the central window 401. The central window 401 may spatially truncate either or both of these sliding elements as each element respectively slides into view or out of view. In corresponding operation 1350, within the interest-improved version of the selection GUI, the central window 401 enhances its suggestion of the second alternative content by presenting the summary text of the second alternative content (e.g., the second summary text). The summary text may be presented superimposed (e.g., as an overlay) on the corresponding preview (e.g., the second preview) of the second alternative content.

In operation 1330, the presented transition includes sliding the source entity logo of the first alternative content (e.g., the source entity logo 415, which may be considered the first source entity logo) together with the source entity logo of the second alternative content (e.g., the source entity logo 425, which may be considered the second source entity logo) in the same shared direction and at the same shared speed outside the central window 401. The central window 401 may spatially truncate either or both of these sliding elements as each element respectively slides into view or out of view. In corresponding operation 1360, within the interest-improved version of the selection GUI, the central window 401 provides the user 132 with a reminder regarding the previously suggested first alternative content by presenting the source entity logo of the first alternative content outside the central window 401.

Figure 14:
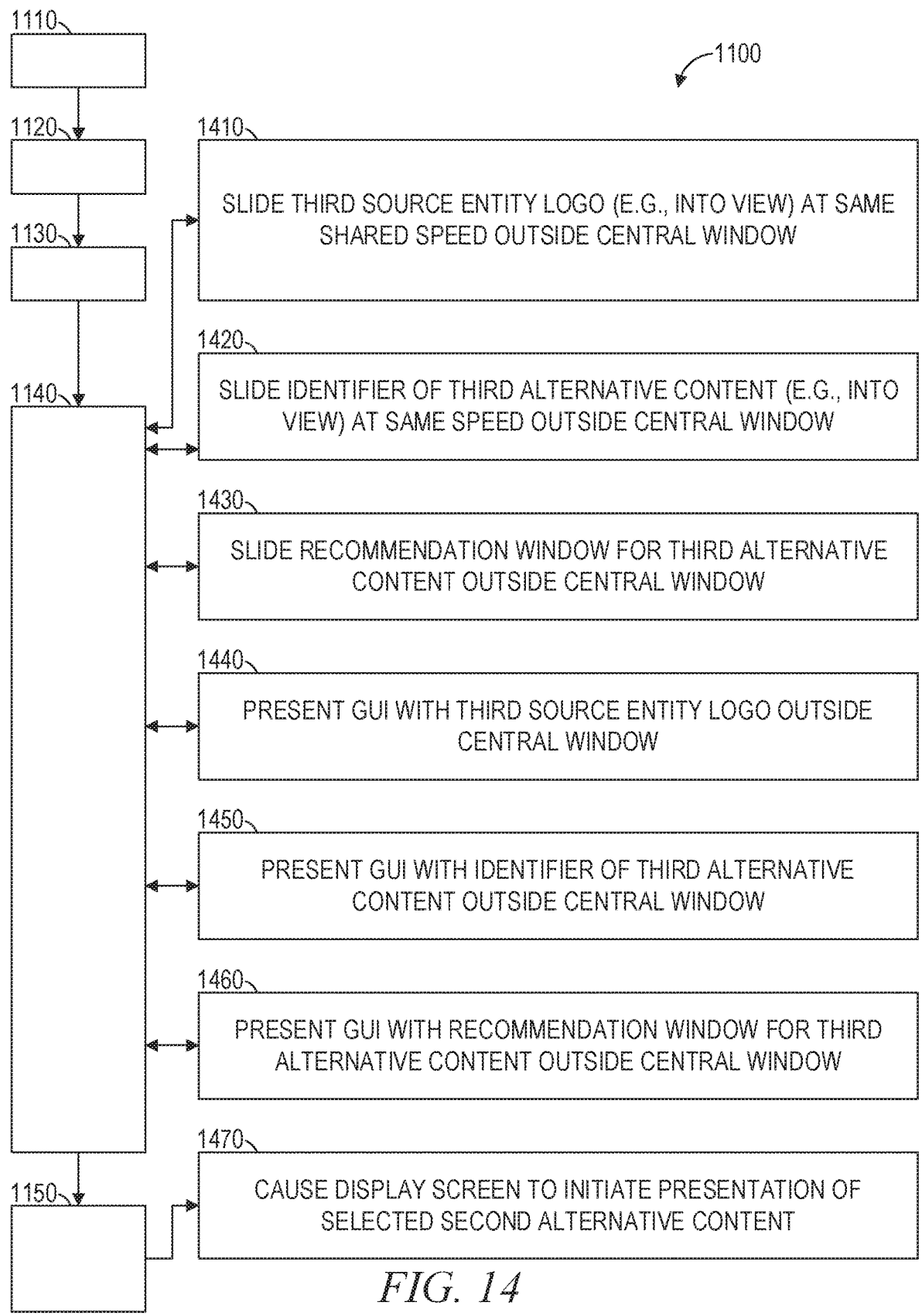

As shown in FIG. 14, in addition to any one or more of the operations previously described, the method 1100 may include one or more of operations 1410, 1420, 1430, 1440, 1450, and 1460, any one or more of which may be performed as part (e.g., a subroutine or a portion) of operation 1140, in which the GUI generator 230 causes the display screen 340 to transition to the interest-improved version of the selection GUI.

In operation 1410, the presented transition includes sliding a logo, such as a source entity logo (e.g., the source entity logo 445, which may be considered a third source entity logo) into view within the selection GUI, outside of the central window 401, and toward the central window 401. For example, the logo may be the source entity logo 445 (e.g., as illustrated in the top portions of FIGS. 5-7), which may identify a source entity of further (e.g., third) alternative content. This logo may be slid in unison with the sliding of the identifiers and previews discussed above with respect to operation 1210, in the same shared direction as those identifiers and previews, at the same shared speed as those identifiers and previews, or any suitable combination thereof. In corresponding operation 1440, the interest-improved version of the selection GUI indicates that the further (e.g., third) alternative content is available for selection by presenting the logo (e.g., the third source entity logo) that was slid into view in operation 1410.

In operation 1420, the presented transition includes sliding an identifier of further alternative content (e.g., the identifier 440, which may be considered a third identifier of third alternative content) into view within the selection GUI, outside of the central window 401, and toward the central window 401. For example, the identifier may be the identifier 440 (e.g., as illustrated in the top portions of FIGS. 6 and 7), which may be a title (e.g., "Better Things") or other phrase that identifies the further (e.g., third) alternative content. This identifier may be slid in unison with the sliding of the identifiers and previews discussed above with respect to operation 1210, in the same shared direction as those identifiers and previews, at the same shared speed as those identifiers and previews, or any suitable combination thereof. In corresponding operation 1450, the interest-improved version of the selection GUI indicates that the further (e.g., third) alternative content is available for selection by presenting the identifier (e.g., the third identifier) that was slid into view in operation 1420.

In operation 1430, the presented transition includes sliding a recommendation window (e.g., the recommendation window 402 or 406) outside the central window 401 and toward the central window 401. The recommendation window presents a spatial portion (e.g., a cropped portion) of a preview (e.g., a third or fourth preview) of further (e.g., third or fourth) alternative content. Furthermore, the sliding of the recommendation window toward the central window 401 may be performed in the same shared direction as the sliding of the identifiers and previews discussed above with respect to operation 1210, at the same shared speed as those identifiers and previews, or both. In corresponding operation 1460, the interest-improved version of the selection GUI indicates that the further (e.g., third or fourth) alternative content is available for selection by presenting the recommendation window (e.g., the recommendation window 402 or 406) that was slid into view in operation 1430.

As further shown in FIG. 14, the method 1100 may include operation 1470, which may be performed as part of operation 1150. As noted above, in some example embodiments, operation 1150 includes the command interface 210 causing the display screen 340 to initiate a presentation of the selected second alternative content. This is explicitly shown in FIG. 14 as operation 1470, which may be performed, for example, by the command interface 210 commanding or otherwise causing the media interface 220 to provide the selected second alternative content (e.g., as a datastream) to the display screen 340 for presentation thereon.

According to various example embodiments, one or more of the methodologies described herein may facilitate generation, provision, and interoperation of a graphical interface (e.g., an interactive selection GUI) in which various elements (e.g., suggestion elements, such as identifiers, previews, timelines, and summary texts) are slid synchronously to provide one or more of the various benefits described herein. Hence, one or more of the methodologies described herein may facilitate preservation of visual-spatial relationships among such elements for a human user (e.g., the user 132), and facilitate maintenance of mental context for the human user, as well as assist the human user in quickly and efficiently making a selection (e.g., recalling presented suggestions, planning navigation paths to a suggestion previously seen, executing an efficient set of control operations to invoke that suggestion, or any suitable combination thereof), compared to capabilities of pre-existing systems and methods.

When these effects are considered in aggregate, one or more of the methodologies described herein may obviate a need for certain efforts or resources that otherwise would be involved in generation, provision, and interoperation of such a graphical interface. Efforts expended by a user (e.g., the user 132) in making a selection may be reduced by use of (e.g., reliance upon) a special-purpose machine that implements one or more of the methodologies described herein. Efforts expended by an administrator (e.g., the user 152) in facilitating other users in making their selections may also be reduced by use of a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 15:
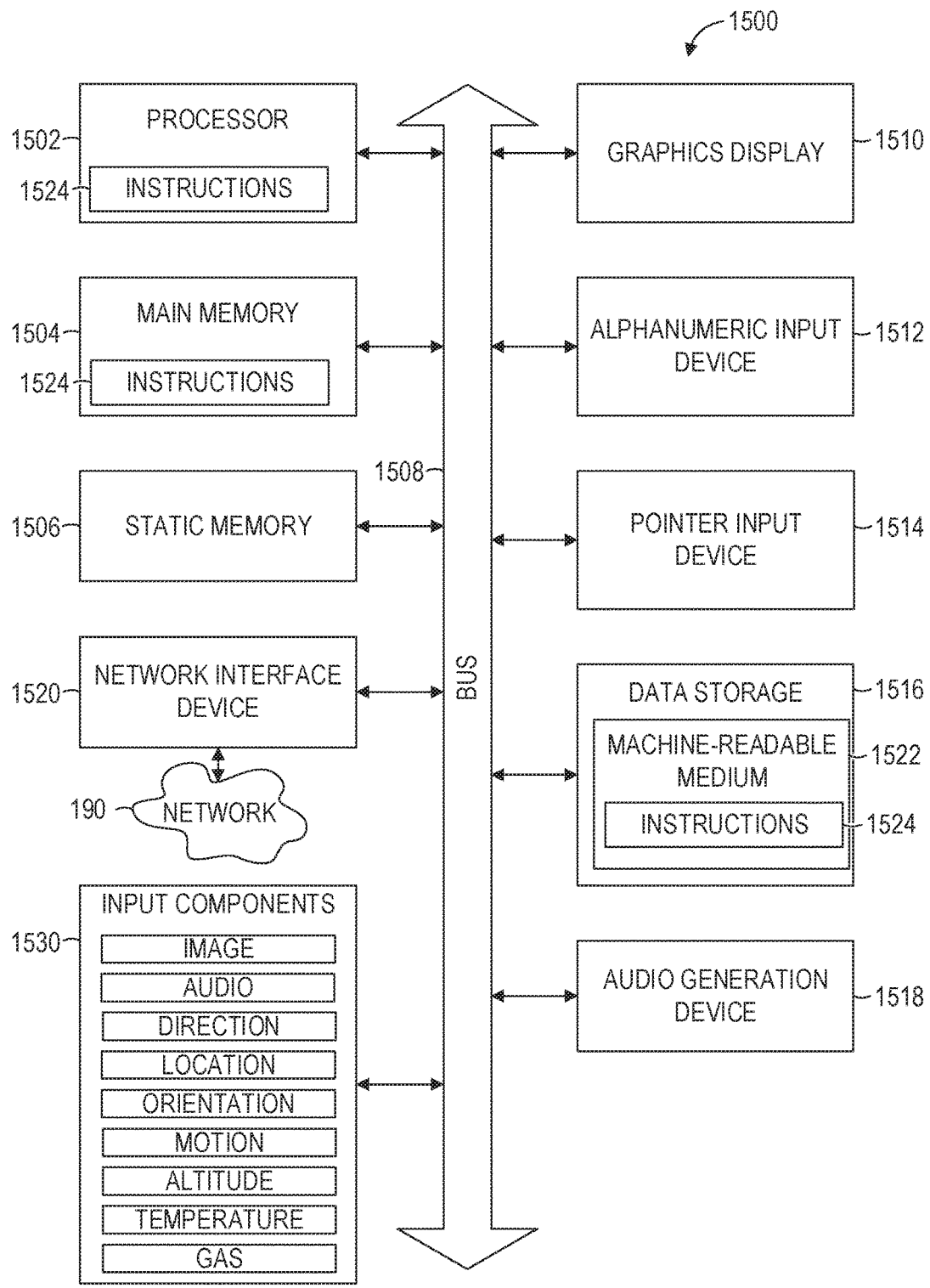
FIG. 15 is a block diagram illustrating components of a machine, according to some example embodiments, able to read instructions from a machine-readable medium and perform any one or more of the methodologies discussed herein.

FIG. 15 is a block diagram illustrating components of a machine 1500, according to some example embodiments, able to read instructions 1524 from a machine-readable medium 1522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 15 shows the machine 1500 in the example form of a computer system (e.g., a computer) within which the instructions 1524 (e.g., software, a program, an application, an applet, an app, or other executable code) for causing the machine 1500 to perform any one or more of the methodologies discussed herein may be executed, in whole or in part.

In alternative embodiments, the machine 1500 operates as a standalone device or may be communicatively coupled (e.g., networked) to other machines. In a networked deployment, the machine 1500 may operate in the capacity of a server machine or a client machine in a server-client network environment, or as a peer machine in a distributed (e.g., peer-to-peer) network environment. The machine 1500 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1524, sequentially or otherwise, that specify actions to be taken by that machine. Further, while only a single machine is illustrated, the term "machine" shall also be taken to include any collection of machines that individually or jointly execute the instructions 1524 to perform all or part of any one or more of the methodologies discussed herein.

The machine 1500 includes a processor 1502 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1504, and a static memory 1506, which are configured to communicate with each other via a bus 1508. The processor 1502 contains solid-state digital microcircuits (e.g., electronic, optical, or both) that are configurable, temporarily or permanently, by some or all of the instructions 1524 such that the processor 1502 is configurable to perform any one or more of the methodologies described herein, in whole or in part. For example, a set of one or more microcircuits of the processor 1502 may be configurable to execute one or more modules (e.g., software modules) described herein. In some example embodiments, the processor 1502 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1500 with at least the processor 1502, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1500 may further include a graphics display 1510 (e.g., a plasma display panel (PDP), a light emitting diode (LED) display, a liquid crystal display (LCD), a projector, a cathode ray tube (CRT), or any other display capable of displaying graphics or video). The machine 1500 may also include an alphanumeric input device 1512 (e.g., a keyboard or keypad), a pointer input device 1514 (e.g., a mouse, a touchpad, a touchscreen, a trackball, a joystick, a stylus, a motion sensor, an eye tracking device, a data glove, or other pointing instrument), a data storage 1516, an audio generation device 1518 (e.g., a sound card, an amplifier, a speaker, a headphone jack, or any suitable combination thereof), and a network interface device 1520.

The data storage 1516 (e.g., a data storage device) includes the machine-readable medium 1522 (e.g., a tangible and non-transitory machine-readable storage medium) on which are stored the instructions 1524 embodying any one or more of the methodologies or functions described herein. The instructions 1524 may also reside, completely or at least partially, within the main memory 1504, within the static memory 1506, within the processor 1502 (e.g., within the processor's cache memory), or any suitable combination thereof, before or during execution thereof by the machine 1500. Accordingly, the main memory 1504, the static memory 1506, and the processor 1502 may be considered machine-readable media (e.g., tangible and non-transitory machine-readable media). The instructions 1524 may be transmitted or received over the network 190 via the network interface device 1520. For example, the network interface device 1520 may communicate the instructions 1524 using any one or more transfer protocols (e.g., hypertext transfer protocol (HTTP)).

In some example embodiments, the machine 1500 may be a portable computing device (e.g., a smart phone, a tablet computer, or a wearable device) and may have one or more additional input components 1530 (e.g., sensors or gauges). Examples of such input components 1530 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 1530 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1524 for execution by the machine 1500, such that the instructions 1524, when executed by one or more processors of the machine 1500 (e.g., processor 1502), cause the machine 1500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1524 for execution by the machine 1500 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1524).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein.

A first example provides a method comprising:
detecting, by one or more processors, a set of first control operations during presentation of current content on a display screen;
in response to the set of first control operations and by the one or more processors, causing the display screen to present a graphical interface in which a central window suggests first alternative content by presenting a first preview thereof and a first identifier thereof superimposed on the first preview;
detecting, by the one or more processors, a second control operation that indicates dismissal of the suggested first alternative content; and
in response to the second control operation and by the one or more processors, causing the display screen to present a transition to an interest-improved version of the graphical interface, the transition including:
sliding (e.g., scrolling) the first preview, the first identifier, a second preview, and a second identifier together in a shared direction and at a shared speed within the central window, the central window spatially truncating the first preview sliding out of view and spatially truncating the second preview sliding into view, the second preview and the second identifier corresponding to second alternative content; and
presenting the interest-improved version of the graphical interface in which the central window suggests the second alternative content by presenting the second preview and the second identifier superimposed thereon.

A second example provides a method according to the first example, wherein:
the transition to the interest-improved version of the graphical user interface further includes:
sliding a recommendation window outside the central window in the shared direction toward the central window, the recommendation window presenting a spatial portion of the second preview of the second alternative content, the central window spatially truncating the recommendation window sliding out of view. Thus, the transition can include an appearance of the recommendation window 402 (e.g., as illustrated in the right side portion of FIG. 7).

A third example provides a method according to the second example, wherein:
the sliding of the recommendation window toward the central window is at the shared speed outside the central window.

A fourth example provides a method according to the second example or the third example, wherein:
the transition to the interest-improved version of the graphical user interface further includes:
sliding a logo outside the central window in the shared direction toward the central window together with the recommendation window, the logo identifying a source entity of the second alternative content, the central window spatially truncating the logo sliding out of view. Thus, the transition can include an appearance of the source entity logo 425 (e.g., as illustrated in the right side portion of FIG. 7).

A fifth example provides a method according to any of the first through fourth examples, wherein:
the transition to the interest-improved version of the graphical user interface further includes:
sliding the first identifier in the shared direction from inside the central window to outside the central window; and
sliding the second identifier in the shared direction from outside the central window into the central window. Thus, the transition can include synchronized movements (e.g., scrolling movements) of the identifier 410 and the identifier 420 outside the boundaries of the central window 401 (e.g., as illustrated in the top and bottom portions of FIGS. 4-7).

A sixth example provides a method according to the fifth example, wherein:
the sliding of the first identifier from inside the central window to outside the central window includes reducing a first font size of the first identifier outside the central window; and
the sliding of the second identifier from outside the central window into the central window includes enlarging a second font size of the second identifier outside the central window. Thus, the transition can include opposite changes in font size between the identifier 410 and the identifier 420 outside the boundaries of the central window 401 (e.g., as illustrated in the top and bottom portions of FIGS. 4-7).

A seventh example provides a method according to the fifth example or the sixth example, wherein:
the sliding of the first identifier from inside the central window to outside the central window occurs at the shared speed outside the central window; and
the sliding of the second identifier from outside the central window into the central window occurs at the shared speed outside the central window.

An eighth example provides a method according to any of the first through seventh examples, wherein:
the display screen includes a central portion and a peripheral portion that surrounds the central portion;
the central window in the graphical interface is aligned with the central portion of the display screen and presents none of the current content; and
the graphical interface includes a peripheral region aligned with the peripheral portion of the display screen, at least some of the peripheral region presenting a darkened version of some of the current content. This may have the effect of causing the peripheral region to appear translucent and partially obscuring current content being simultaneously presented on the display screen 340, while the central window 401 appears opaque and fully obscures the current content.

A ninth example provides a method according to any of the first through eighth examples, wherein:
the transition to the interest-improved version of the graphical user interface further includes:
sliding a first timeline and a second timeline together in the shared direction and at the shared speed within the central window, the central window spatially truncating the first timeline sliding out of view and spatially truncating the second timeline sliding into view, the first timeline indicating a first playback point within the first alternative content, the second timeline indicating a second playback point within the second alternative content; and wherein
the central window in the interest-improved version of the graphical interface presents the second timeline superimposed on the second preview. Thus, the transition can include synchronized movements of the timeline 412 and the timeline 422 within the central window 401 (e.g., as illustrated in FIGS. 4-7), or of the timeline 422 and the timeline 432 within the central window 401 (e.g., as illustrated in FIGS. 7-10).

A tenth example provides a method according to any of the first through ninth examples, wherein:
the transition to the interest-improved version of the graphical user interface further includes:
sliding first summary text and second summary text together in the shared direction and at the shared speed within the central window, the central window spatially truncating the first summary text sliding out of view and spatially truncating the second summary text sliding into view, the first summary text summarizing the first alternative content, the second summary text summarizing the second alternative content; and wherein
the central window in the interest-improved version of the graphical interface presents the second summary text superimposed on the second preview. Thus, the transition can include synchronized movements of the summary text 413 and the summary text 423 within the central window 401 (e.g., as illustrated in FIGS. 4-7), or of the summary text 423 and the summary text 433 within the central window 401 (e.g., as illustrated in FIGS. 7-10).

An eleventh example provides a method according to any of the first through tenth examples, wherein:
the transition to the interest-improved version of the graphical user interface further includes:
sliding a first logo and a second logo together in the shared direction and at the shared speed outside the central window, the central window spatially truncating the first logo sliding into view and spatially truncating the second logo sliding out of view, the first logo identifying a first source entity of the first alternative content, the second logo identifying a second source entity of the second alternative content; and wherein
the interest-improved version of the graphical interface presents the first logo outside the central window. Thus, the transition can include an appearance of the source entity logo 415 synchronized with the disappearance of the source entity logo 425 outside the boundaries of the central window 401 (e.g., as illustrated in the left portions of FIGS. 4-7).

A twelfth example provides a method according to the eleventh example, wherein:
the transition to the interest-improved version of the graphical user interface further includes:
sliding a third logo outside the central window in the shared direction and at the shared speed toward the central window, the third logo identifying a third source entity of third alternative content; and wherein the interest-improved version of the graphical interface presents the third logo outside the central window. Thus, the transition can include an appearance of the source entity logo 445 outside the boundaries of the central window 401 (e.g., as illustrated in the top portions of FIGS. 5-7).

A thirteenth example provides a method according to any of the first through twelfth examples, wherein:

the transition to the interest-improved version of the graphical user interface further includes:

sliding a third identifier outside the central window in the shared direction and at the shared speed toward the central window, the third identifier corresponding to third alternative content; and wherein the interest-improved version of the graphical interface presents the third identifier outside the central window. Thus, the transition can include an appearance of the identifier 440 outside the boundaries of the central window 401 (e.g., as illustrated in the top portions of FIGS. 6 and 7).

A fourteenth example provides a method according to any of the first through thirteenth examples, wherein:

the transition to the interest-improved version of the graphical user interface further includes:

sliding a recommendation window outside the central window in the shared direction and at the shared speed toward the central window, the recommendation window presenting a spatial portion of a third preview of third alternative content; and wherein the interest-improved version of the graphical interface presents the recommendation window outside the central window. Thus, the transition can include an appearance of the recommendation window 406 (e.g., as illustrated in the right side portion of FIG. 10).

A fifteenth example provides a method according to any of the first through fourteenth examples, wherein:

the second control operation that indicates dismissal of the suggested first alternative content includes activation of a directional control that corresponds to a direction matching the shared direction in which the first preview, the first identifier, the second preview, and the second identifier are slid together within the central window. Accordingly, activation of a down button or a downward joystick motion can cause the shared direction to be downward relative to the display screen 340 (e.g., as illustrated in FIGS. 4-7).

A sixteenth example provides a method according to any of the first through fourteenth examples, wherein:

the second control operation that indicates dismissal of the suggested first alternative content includes activation of a directional control that corresponds to a direction opposing the shared direction in which the first preview, the first identifier, the second preview, and the second identifier are slid together within the central window. Accordingly, activation of a right button or a rightward joystick motion can cause the shared direction to be rightward relative to the display screen 340 (e.g., as illustrated in FIGS. 7-10).

A seventeenth example provides a method according to any of the first through sixteenth examples, further comprising:

detecting a third control operation that indicates selection of the second alternative content suggested by the central window in the interest-improved version of the graphical interface; and causing the display screen to initiate a presentation of the selected second alternative content.

An eighteenth example provides a machine-readable medium (e.g., a non-transitory machine-readable storage medium) comprising instructions that, when executed by one or more processors of a machine (e.g., device 130 or media machine 110), cause the machine to perform operations comprising:

detecting a set of first control operations during presentation of current content on a display screen;

in response to the set of first control operations, causing the display screen to present a graphical interface in which a central window suggests first alternative content by presenting a first preview thereof and a first identifier thereof superimposed on the first preview;

detecting a second control operation that indicates dismissal of the suggested first alternative content; and in response to the second control operation, causing the display screen to present a transition to an interest-improved version of the graphical interface, the transition including:

sliding the first preview, the first identifier, a second preview, and a second identifier together in a shared direction and at a shared speed within the central window, the central window spatially truncating the first preview sliding out of view and spatially truncating the second preview sliding into view, the second preview and the second identifier corresponding to second alternative content; and presenting the interest-improved version of the graphical interface in which the central window suggests the second alternative content by presenting the second preview and the second identifier superimposed thereon.

A nineteenth example provides a system (e.g., computer system) comprising:

one or more processors; and a memory storing instructions that, when executed by at least one processor among the one or more processors, cause the system to perform operations comprising:

detecting a set of first control operations during presentation of current content on a display screen;

in response to the set of first control operations, causing the display screen to present a graphical interface in which a central window suggests first alternative content by presenting a first preview thereof and a first identifier thereof superimposed on the first preview;

detecting a second control operation that indicates dismissal of the suggested first alternative content; and in response to the second control operation, causing the display screen to present a transition to an interest-improved version of the graphical interface, the transition including:

sliding the first preview, the first identifier, a second preview, and a second identifier together in a shared direction and at a shared speed within the central window, the central window spatially truncating the first preview sliding out of view and spatially truncating the second preview sliding into view, the second preview and the second identifier corresponding to second alternative content; and presenting the interest-improved version of the graphical interface in which the central window suggests the second alternative content by presenting the second preview and the second identifier superimposed thereon.

A twentieth example provides a system according to the nineteenth example, wherein the operations further comprise:

detecting a third control operation that indicates selection of the second alternative content suggested by the central window in the interest-improved version of the graphical interface; and causing the display screen to initiate a presentation of the selected second alternative content.

A twenty-first example provides a carrier medium carrying machine-readable instructions for controlling a machine to carry out the operations (e.g., method operations) performed in any one of the previously described examples.

What is claimed is:

1. A method comprising:

detecting, by one or more processors, a set of first control operations during presentation of current content on a display screen;

in response to the set of first control operations and by the one or more processors, causing, on the display screen, presentation of a graphical interface in which a central window suggests first alternative content by presenting a first preview thereof and a first identifier thereof superimposed on the first preview;

detecting, by the one or more processors, a second control operation to dismiss the suggested first alternative content; and in response to the second control operation and by the one or more processors, causing, on the display screen, a transition to a modified version of the graphical interface, the transition including:

sliding the first preview, the first identifier, a second preview, and a second identifier together in a direction and at a speed within the central window, the central window cropping the first preview sliding out of view and cropping the second preview sliding into view, the second preview and the second identifier corresponding to second alternative content; and presenting the modified version of the graphical interface in which the central window suggests the second alternative content by presenting the second preview and the second identifier superimposed thereon.

2. The method of claim 1, wherein:

the transition to the modified version of the graphical interface further includes:

sliding a recommendation window outside the central window in the direction toward the central window, the recommendation window presenting a spatial portion of the second preview of the second alternative content, the central window cropping the recommendation window sliding out of view.

3. The method of claim 2, wherein:

the sliding of the recommendation window toward the central window is at the speed outside the central window.

4. The method of claim 2, wherein:

the transition to the modified version of the graphical interface further includes:

sliding a logo outside the central window in the direction toward the central window together with the recommendation window, the logo identifying a source entity of the second alternative content, the central window cropping the logo sliding out of view.

5. The method of claim 1, wherein:

the transition to the modified version of the graphical interface further includes:

sliding the first identifier in the direction from inside the central window to outside the central window; and sliding the second identifier in the direction from outside the central window into the central window.

6. The method of claim 5, wherein:

the sliding of the first identifier from inside the central window to outside the central window includes reducing a first font size of the first identifier outside the central window; and the sliding of the second identifier from outside the central window into the central window includes enlarging a second font size of the second identifier outside the central window.

7. The method of claim 5, wherein:

the sliding of the first identifier from inside the central window to outside the central window occurs at the speed outside the central window; and the sliding of the second identifier from outside the central window into the central window occurs at the speed outside the central window.

8. The method of claim 1, wherein:

the display screen includes a central portion and a peripheral portion that surrounds the central portion;

the central window in the graphical interface is aligned with the central portion of the display screen and presents none of the current content; and the graphical interface includes a peripheral region aligned with the peripheral portion of the display screen, at least some of the peripheral region presenting a darkened version of some of the current content.

9. The method of claim 1, wherein:

the transition to the modified version of the graphical interface further includes:

sliding a first timeline and a second timeline together in the direction and at the speed within the central window, the central window cropping the first timeline sliding out of view and cropping the second timeline sliding into view, the first timeline indicating a first playback point within the first alternative content, the second timeline indicating a second playback point within the second alternative content; and wherein the central window in the modified version of the graphical interface presents the second timeline superimposed on the second preview.

10. The method of claim 1, wherein:

the transition to the modified version of the graphical interface further includes:

sliding first summary text and second summary text together in the shared direction and at the speed within the central window, the central window cropping the first summary text sliding out of view and cropping the second summary text sliding into view, the first summary text summarizing the first alternative content, the second summary text summarizing the second alternative content; and wherein the central window in the modified version of the graphical interface presents the second summary text superimposed on the second preview.

11. The method of claim 1, wherein:

the transition to the modified version of the graphical interface further includes:

sliding a first logo and a second logo together in the direction and at the speed outside the central window, the central window cropping the first logo sliding into view and cropping the second logo sliding out of view, the first logo identifying a first source entity of the first alternative content, the second logo identifying a second source entity of the second alternative content; and wherein the modified version of the graphical interface presents the first logo outside the central window.

12. The method of claim 11, wherein:

the transition to the modified version of the graphical interface further includes:

sliding a third logo outside the central window in the direction and at the speed toward the central window, the third logo identifying a third source entity of third alternative content; and wherein the modified version of the graphical interface presents the third logo outside the central window.

13. The method of claim 1, wherein:

the transition to the modified version of the graphical interface further includes:

sliding a third identifier outside the central window in the direction and at the speed toward the central window, the third identifier corresponding to third alternative content; and wherein the modified version of the graphical interface presents the third identifier outside the central window.

14. The method of claim 1, wherein:

the transition to the modified version of the graphical interface further includes:

sliding a recommendation window outside the central window in the direction and at the speed toward the central window, the recommendation window presenting a spatial portion of a third preview of third alternative content; and wherein the modified version of the graphical interface presents the recommendation window outside the central window.

15. The method of claim 1, wherein:

the second control operation to dismiss the suggested first alternative content includes activation of a directional control that corresponds to a direction matching the direction in which the first preview, the first identifier, the second preview, and the second identifier are slid together within the central window.

16. The method of claim 1, wherein:

the second control operation to dismiss the suggested first alternative content includes activation of a directional control that corresponds to a direction opposing the direction in which the first preview, the first identifier, the second preview, and the second identifier are slid together within the central window.

17. The method of claim 1, further comprising:

detecting a third control operation to select the second alternative content suggested by the central window in the modified version of the graphical interface; and causing, on the display screen, initiation of a presentation of the selected second alternative content.

18. A non-transitory machine-readable medium comprising instructions that, when executed by one or more processors of a machine, cause the machine to perform operations comprising:

detecting a set of first control operations during presentation of current content on a display screen;

in response to the set of first control operations, causing, on the display screen, presentation of a graphical interface in which a central window suggests first alternative content by presenting a first preview thereof and a first identifier thereof superimposed on the first preview;

detecting a second control operation to dismiss the suggested first alternative content; and in response to the second control operation, causing, on the display screen, a transition to a modified version of the graphical interface, the transition including:

sliding the first preview, the first identifier, a second preview, and a second identifier together in a direction and at a speed within the central window, the central window cropping the first preview sliding out of view and cropping the second preview sliding into view, the second preview and the second identifier corresponding to second alternative content; and presenting the modified version of the graphical interface in which the central window suggests the second alternative content by presenting the second preview and the second identifier superimposed thereon.

19. A system comprising:

one or more processors; and a memory storing instructions that, when executed by at least one processor among the one or more processors, cause the system to perform operations comprising:

detecting a set of first control operations during presentation of current content on a display screen;

in response to the set of first control operations, causing, on the display screen, presentation of a graphical interface in which a central window suggests first alternative content by presenting a first preview thereof and a first identifier thereof superimposed on the first preview;

detecting a second control operation to dismiss the suggested first alternative content; and in response to the second control operation, causing, on the display screen, a transition to a modified version of the graphical interface, the transition including:

sliding the first preview, the first identifier, a second preview, and a second identifier together in a direction and at a speed within the central window, the central window cropping the first preview sliding out of view and cropping the second preview sliding into view, the second preview and the second identifier corresponding to second alternative content; and presenting the modified version of the graphical interface in which the central window suggests the second alternative content by presenting the second preview and the second identifier superimposed thereon.

20. The system of claim 19, wherein the operations further comprise:

detecting a third control operation to select the second alternative content suggested by the central window in the modified version of the graphical interface; and causing, on the display screen, initiation of a presentation of the selected second alternative content.

* * * * *